(12) United States Patent
Palanisamy et al.

(10) Patent No.: US 9,073,761 B2
(45) Date of Patent: Jul. 7, 2015

(54) CONTROLLED SYNTHESIS OF NANOPARTICLES USING ULTRASOUND IN CONTINUOUS FLOW

(71) Applicant: Oregon State University, Corvallis, OR (US)

(72) Inventors: Barath Palanisamy, Corvallis, OR (US); Brian K. Paul, Corvallis, OR (US); Ravindranadh Tagore Eluri, Corvallis, OR (US)

(73) Assignee: THE STATE OF OREGON ACTING BY AND THROUGH THE STATE BOARD OF HIGHER EDUCATION, OREGON STATE UNIVERSITY, Corvallis, OR (US)

( * ) Notice: Subject to any disclaimer, the term of this patent is extended or adjusted under 35 U.S.C. 154(b) by 0 days.

(21) Appl. No.: 14/203,900

(22) Filed: Mar. 11, 2014

(65) Prior Publication Data

US 2014/0255293 A1     Sep. 11, 2014

Related U.S. Application Data

(60) Provisional application No. 61/776,232, filed on Mar. 11, 2013.

(51) Int. Cl.
| | |
|---|---|
| *C01G 11/02* | (2006.01) |
| *B06B 3/00* | (2006.01) |
| *B82Y 30/00* | (2011.01) |
| *B82Y 40/00* | (2011.01) |

(52) U.S. Cl.
CPC . *C01G 11/02* (2013.01); *B06B 3/00* (2013.01); *Y10S 977/896* (2013.01); *Y10S 977/773* (2013.01); *B82Y 40/00* (2013.01); *B82Y 30/00* (2013.01)

(58) Field of Classification Search
USPC ........ 423/561.1, 566.1; 252/62.3 R; 977/773, 977/774, 775, 813, 896; 422/128, 129, 187
See application file for complete search history.

(56) References Cited

U.S. PATENT DOCUMENTS

| | | | | |
|---|---|---|---|---|
| 3,202,281 | A * | 8/1965 | Weston .......................... | 209/166 |
| 2004/0022695 | A1* | 2/2004 | Simon et al. ................... | 422/128 |
| 2010/0314008 | A1* | 12/2010 | Epshteyn et al. ............. | 148/513 |
| 2011/0288060 | A1* | 11/2011 | Ruecroft et al. .............. | 514/174 |

OTHER PUBLICATIONS

Gao, T., et al., "Sonochemical Synthesis, Optical Properties, and Electrical Properties of Core/Shell-Type ZnO Nanorod/CdS Nanoparticle Composites," Chem. Mater. (2005) 17:887-892.

(Continued)

*Primary Examiner* — Timothy Vanoy
(74) *Attorney, Agent, or Firm* — Robert C. Netter, Jr.; Kathleen D. Rigaut; Dann, Dorfman, Herrell & Skillman

(57) ABSTRACT

Apparatuses and methods for synthesizing nanoparticles are provided. Methods for synthesizing nanoparticles are provided comprising mixing at least two solutions comprising the components of the nanoparticles within a micromixer; exposing the resultant mixed, unreacted, azeotropic solution to ultrasound; and collecting the generated nanoparticles. Apparatuses are also provided for synthesizing nanoparticles comprising a micromixer in fluid connection with a continuous reactor comprising at least one inlet, at least one outlet, and an ultrasound horn oriented such that the acoustic energy is transferred to the fluid within the continuous reactor.

23 Claims, 19 Drawing Sheets

(56) References Cited

OTHER PUBLICATIONS

Figure 1:
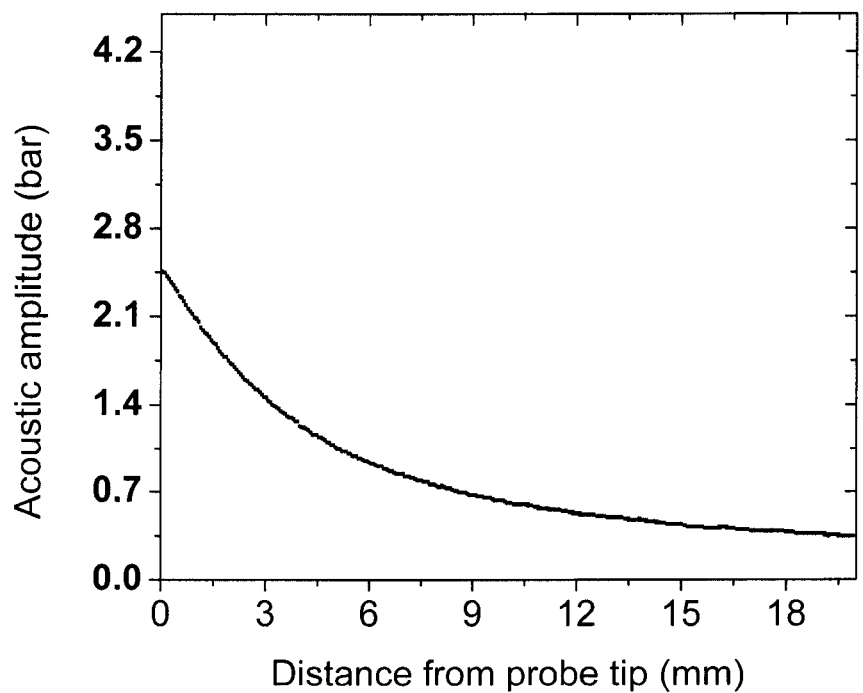

Wang, S.F., et al., "Sonochemical Synthesis of Hollow PbS Nanospheres," Langmuir (2006) 22:398-401.
Ciawi, E., et al., "Determination of Temperatures within Acoustically Generated Bubbles in Aqueous Solutions at Different Ultrasound Frequencies," J. Phys. Chem. B (2006) 110:13656-13660.
Colussi, A.J., et al., "Chemical Bubble Dynamics and Quantitative Sonochemistry" J. Phys. Chem. A (1998) 102:6927-6934.
Han, H.Y., et al., "A Novel Method for the Preparation of Water-Soluble and Small-Size CdSe Quantum Dots" Materials Lett. (2006) 60:3782-3785.
Bang, J.H., et al., "Applications of Ultrasound to the Synthesis of Nanostructured Materials," Advanced Mater. (2010) 22(10):1039-1059.
Amutha, R., et al., "Facile Microwave-Combustion Synthesis of Wurtzite CdS Nanoparticles," J. Nanosci. Nanotechnol. (2011) 11:7940-7944.
Chang, Y.J., et al., "Investigate the Reacting Flux of Chemical Bath Deposition by a Continuous Flow Microreactor," Electrochem. Solid-State Lett. (2009) 12(7):H244-H247.
Mugdur, P.H., et al., "A Comparison of Chemical Bath Deposition of CdS from a Batch Reactor and a Continuous-Flow Microreactor," J. Electrochem. Soc. (2007) 154(9):D482-D488.
Xie, R., et al., "Surface Synthesis of PbS Nanoparticles on Silica Spheres by a Sonochemical Approach," J. Mater. Sci. (2007) 42:1376-1380.
Suslick, K.S., et al., "Applications of Ultrasound to Materials Chemistry," Annu. Rev. Mater. Sci. (1999) 29:295-326.
Mastai, Y., et al., "Sonochemistry and Other Novel Methods Developed for the Synthesis of Nanoparticles," ChemInform (2006) 37(17):113-169; doi:10.1002/chin.200617274.
Kristl, M., et al., "A Sonochemical Method for the Preparation of Cadmium Sulfide and Cadmium Selenide Nanoparticles in Aqueous Solutions" Ultasonics Sonochem. (2010) 17:916-922.
Chow, R., et al., "A Study on the Primary and Secondary Nucleation of Ice by Power of Ultrasound," Ultrasonics (2005) 43:227-230.
Luque De Castro, M.D., et al., "Ultrasound-assisted Crystallization (Sonocrystallization)," Ultrasonics Sonochemistry (2007) 14:717-724.
Ghows, N., et al., "A Novel Method for the Synthesis of CdS Nanoparticles without Surfactant," Ultrasonics Sonochemistry (2011) 18:269-275.
Banert, T., et al. "Operating Parameters of a Continuous Sonochemical Precipitation Reactor," Proc. 5 WCPT, Orlando, FL, (2006).

\* cited by examiner

After 1 hr

After 2 hr

After 1 hr

After 2 hr

CONTROLLED SYNTHESIS OF NANOPARTICLES USING ULTRASOUND IN CONTINUOUS FLOW

This application claims priority under 35 U.S.C. §119(e) to U.S. Provisional Patent Application No. 61/776,232, filed Mar. 11, 2013. The foregoing application is incorporated by reference herein.

This invention was made with government support under Blanket Master Agreement No. 57494, Task Order No. 79791 awarded by the Department of Energy. The government has certain rights in the invention.

FIELD OF THE INVENTION

The present invention relates to the field of nanoparticle synthesis. Specifically, methods and apparatuses for the synthesis of nanoparticles including quantum dots are disclosed.

BACKGROUND OF THE INVENTION

Several publications and patent documents are cited throughout the specification in order to describe the state of the art to which this invention pertains. Each of these citations is incorporated herein by reference as though set forth in full.

There are several methods for the synthesis of nanoparticles of binary compounds like CdS, PbS, $CeO_2$, $SiO_2$, $Mo_2C$, $W_2C$, etc. in both solution phase and vapor phase. Current methods of producing high aspect ratio nanoparticles involves processing at very high temperatures with vapor phase and typically involves high capital costs and maintenance costs for the equipment. Sonochemical methods are generally differentiated because of the unconventional heating method using ultrasound induced cavitation. This results in very high local temperatures leading to unique conditions in the bath as opposed to conventional heating methods. In batch sonochemistry, the process is plagued with lack of adequate control on particle size, long processing times for completion, and generation of unusable waste particles. Accordingly, improved methods for the sonochemical synthesis of nanoparticles are desired.

SUMMARY OF THE INVENTION

In accordance with the present invention, methods for synthesizing nanoparticles are provided. In a particular embodiment, the method comprises exposing a mixed, unreacted solution comprising the components of the nanoparticles to ultrasound and collecting and/or isolating the generated nanoparticles. The method may comprise mixing at least two solutions (e.g., solutions comprising the components of the nanoparticles) to generate the mixed, unreacted solution to be exposed to the ultrasound (e.g., just prior to ultrasound exposure). In a particular embodiment, the components of the nanoparticle are mixed in an azeotropic solution. The mixer may comprise at least two inlets and at least one outlet, wherein the inlets direct fluid streams into a confined mixing region, particularly such that the fluid streams are directed at each other. The method may further comprise quenching the generated nanoparticles, optionally after a delay to allow growth of the nanoparticles. In a particular embodiment, the ultrasound used in the method has an average power of about 10 W to 200 W and a frequency of about 10 kHz to about 100 kHz and the fluid is exposed to ultrasound for less than about three minutes. Depending on the desired final product, exposure time can also be easily varied by changing the residence time in the reactor (e.g., changing flow rate and/or reactor volume). The methods may also further comprise the use of a cooling system to neutralize excess heat from the use of the ultrasound and the sonochemical reaction.

In a particular embodiment, the mixed, unreacted solution is exposed to ultrasound within a continuous reactor (flow cell), wherein the continuous reactor comprises at least one inlet, at least one outlet, and an ultrasound horn, wherein the ultrasound horn is oriented such that the tip of the ultrasound horn is in contact with the mixed, unreacted solution. In a particular embodiment, the internal volume of the continuous reactor is less than about 10 ml and/or the depth of the fluid in front of the tip of the ultrasound horn is less than about 5 mm.

In a particular embodiment, the mixed, unreacted solution is exposed to ultrasound within tubing comprising a conical portion, wherein an ultrasound horn is oriented such that the tip of the ultrasound horn is within the interior space created by the conical portion of the tubing. The conical portion of tubing and the ultrasound horn tip may be submerged in a cooling system.

In accordance with the instant invention, apparatuses for performing the above methods are also provided.

BRIEF DESCRIPTIONS OF THE DRAWING

FIG. 1 provides a graph showing the reduction in acoustic amplitude as a function of distance away for ultrasound horn tip.

Figure 2:
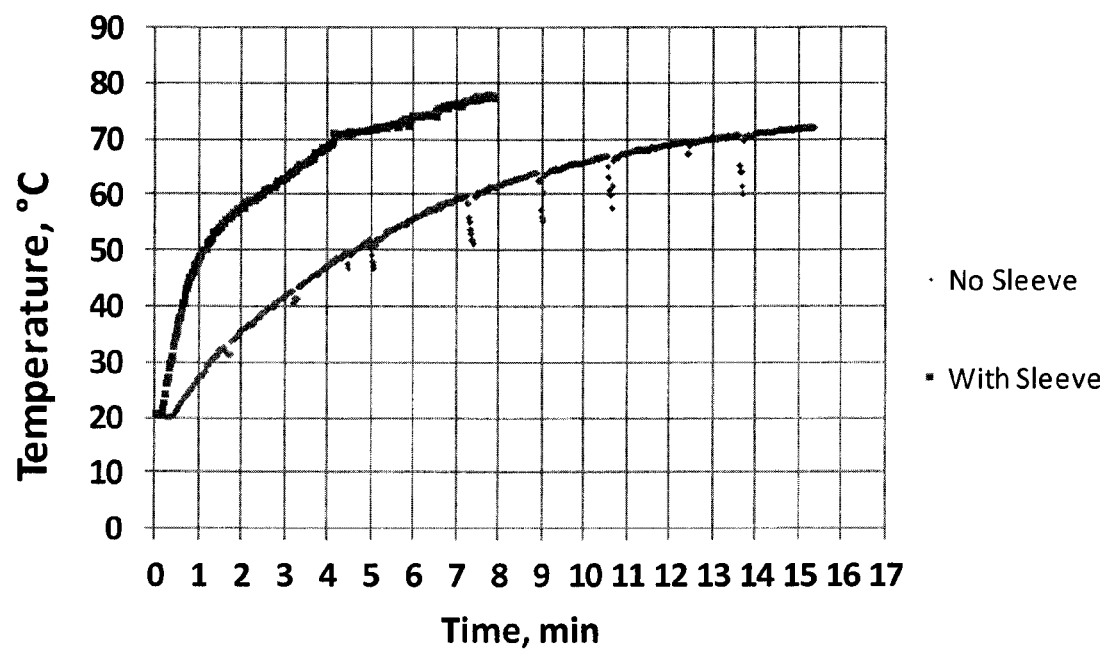

FIG. 2 provides a graph showing the effect of volume reduction on heating rate.

Figure 3:
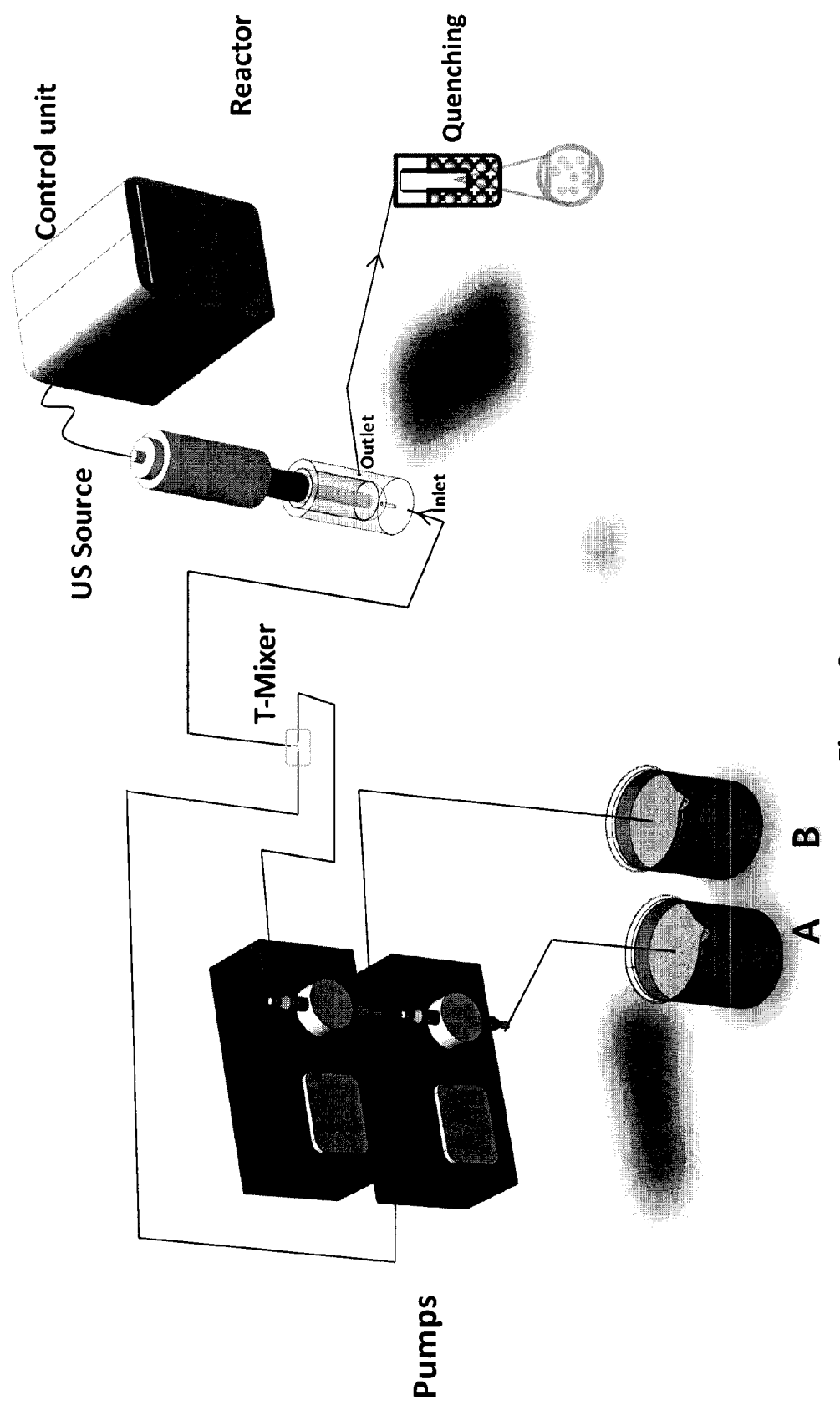

FIG. 3 provides a schematic of a continuous sonochemical reactor setup.

Figure 4:
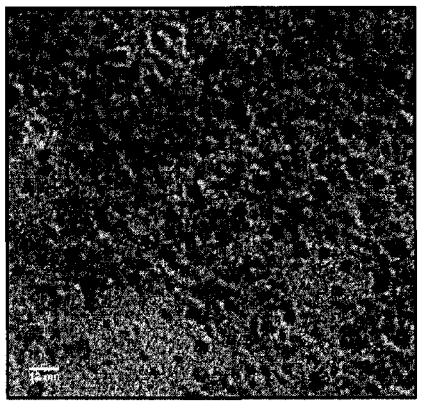
Figure 4:
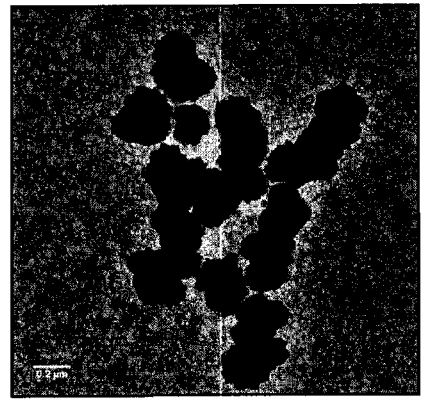
Figure 4:
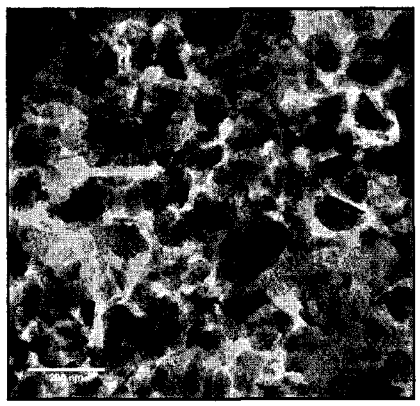
Figure 4:
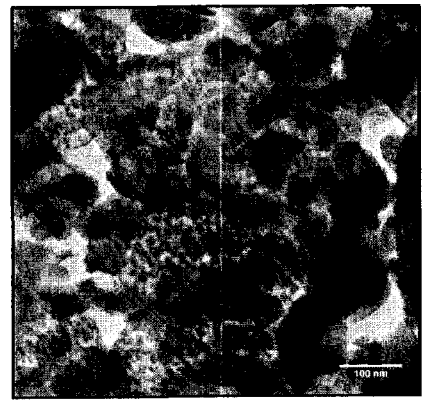

FIG. 4 provides images of particle morphology of CdS in batch synthesis after 1 hour or after 2 hours.

Figure 5A:
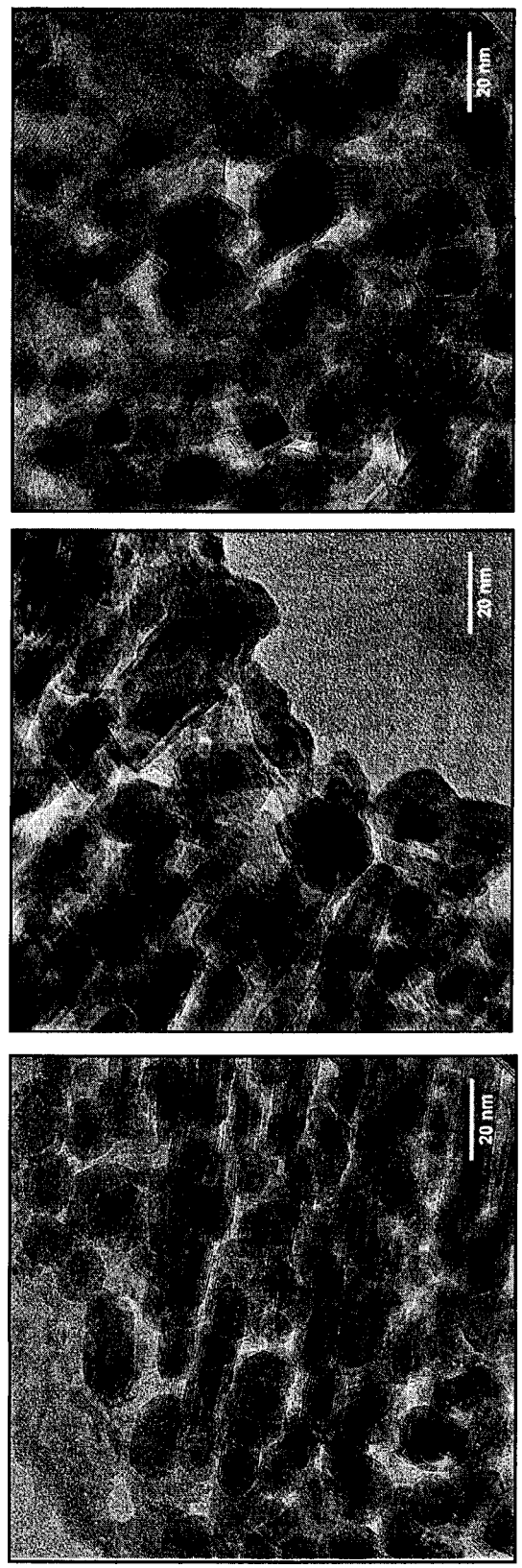
Figure 5B:
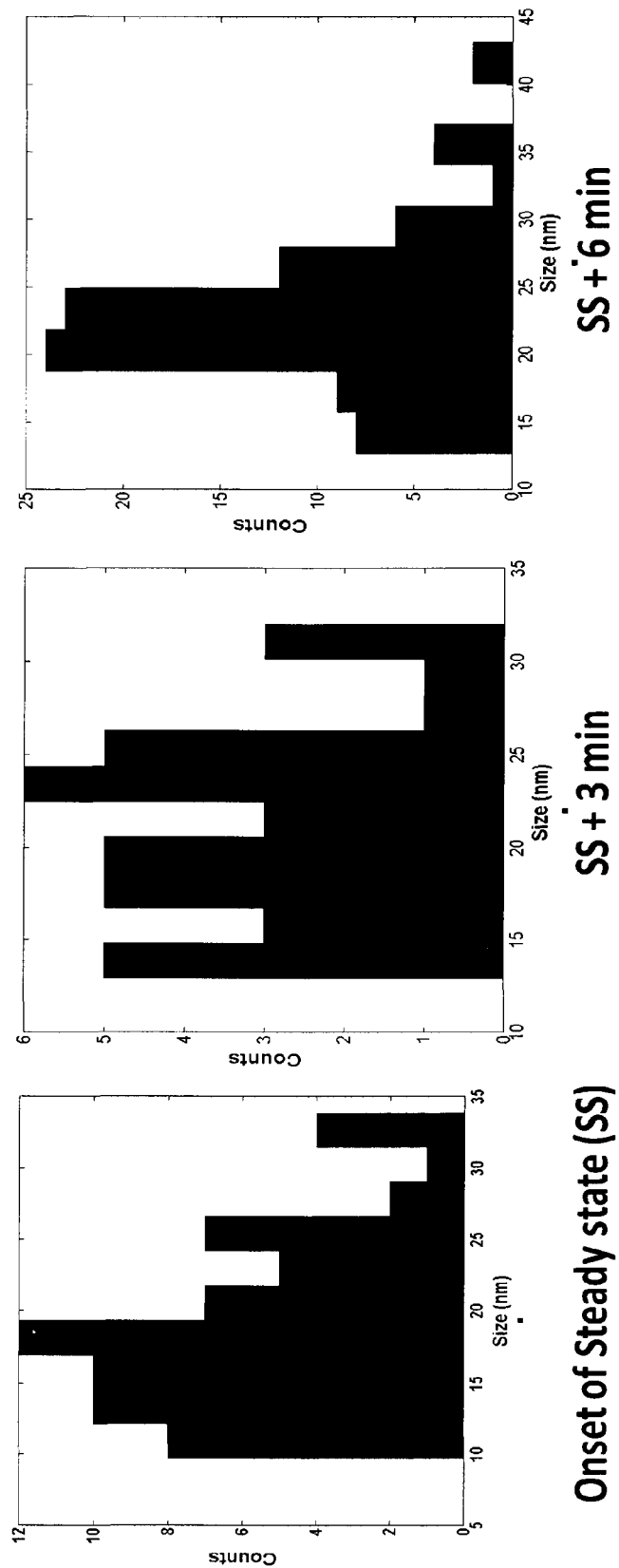

FIG. 5A provides transmission electron micrographs of particle morphology of CdS in continuous synthesis at the onset of steady state, 3 minutes after steady state, and 6 minutes after steady state. FIG. 5B provides graphs of the corresponding particle size distributions.

Figure 6A:
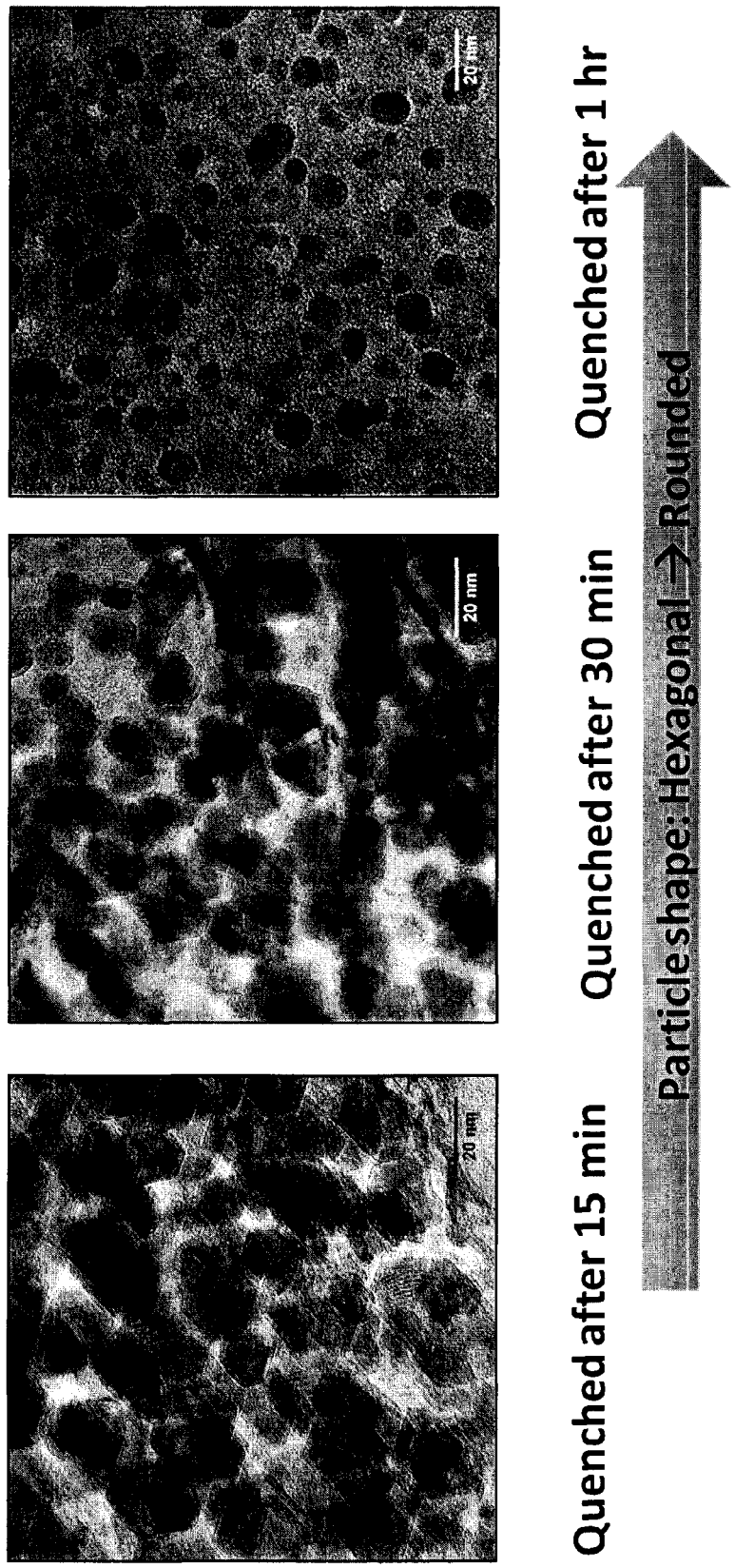
Figure 6B:
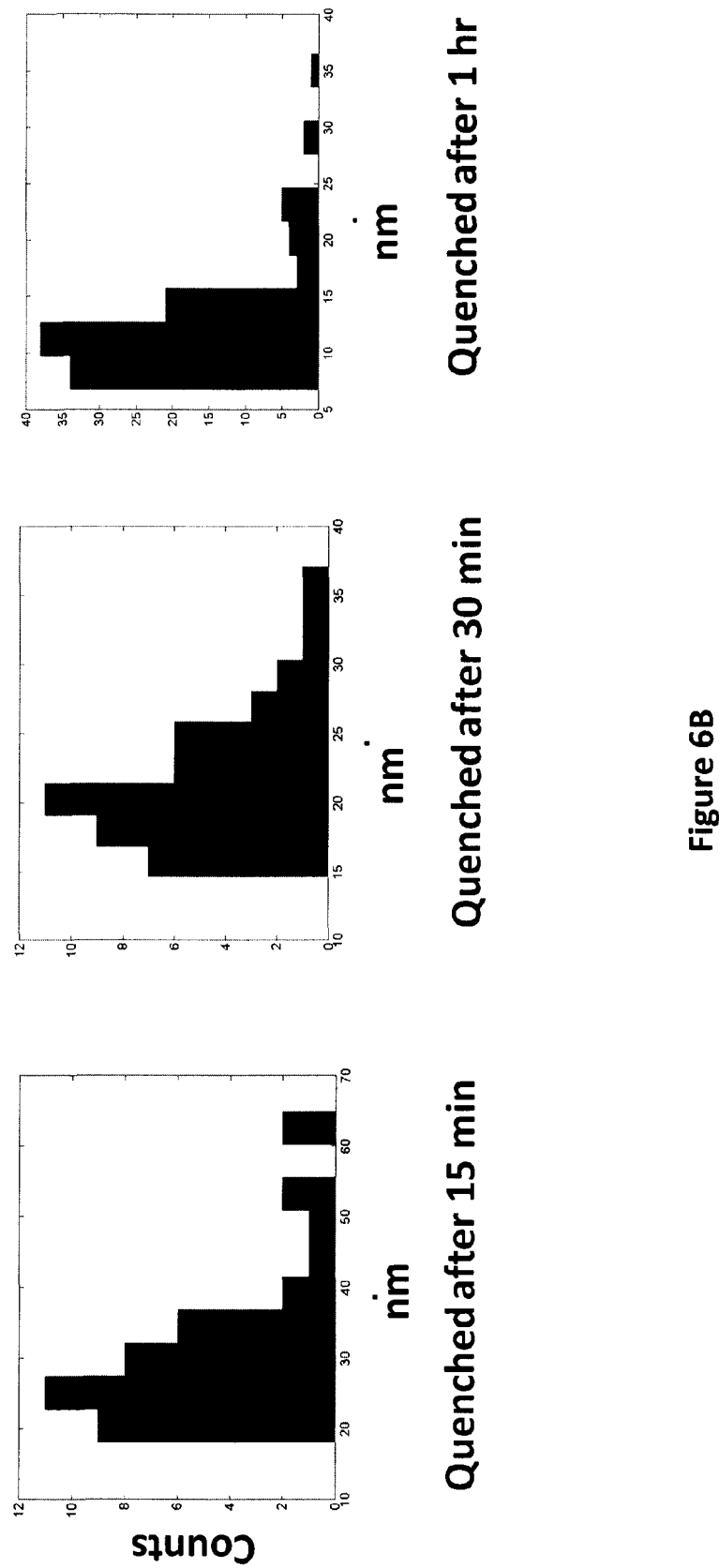

FIG. 6A provides transmission electron micrographs showing the change in CdS nanoparticles (NP) morphology as a function of quench delay. FIG. 6B provides graphs of the corresponding particle size distributions.

Figure 7:
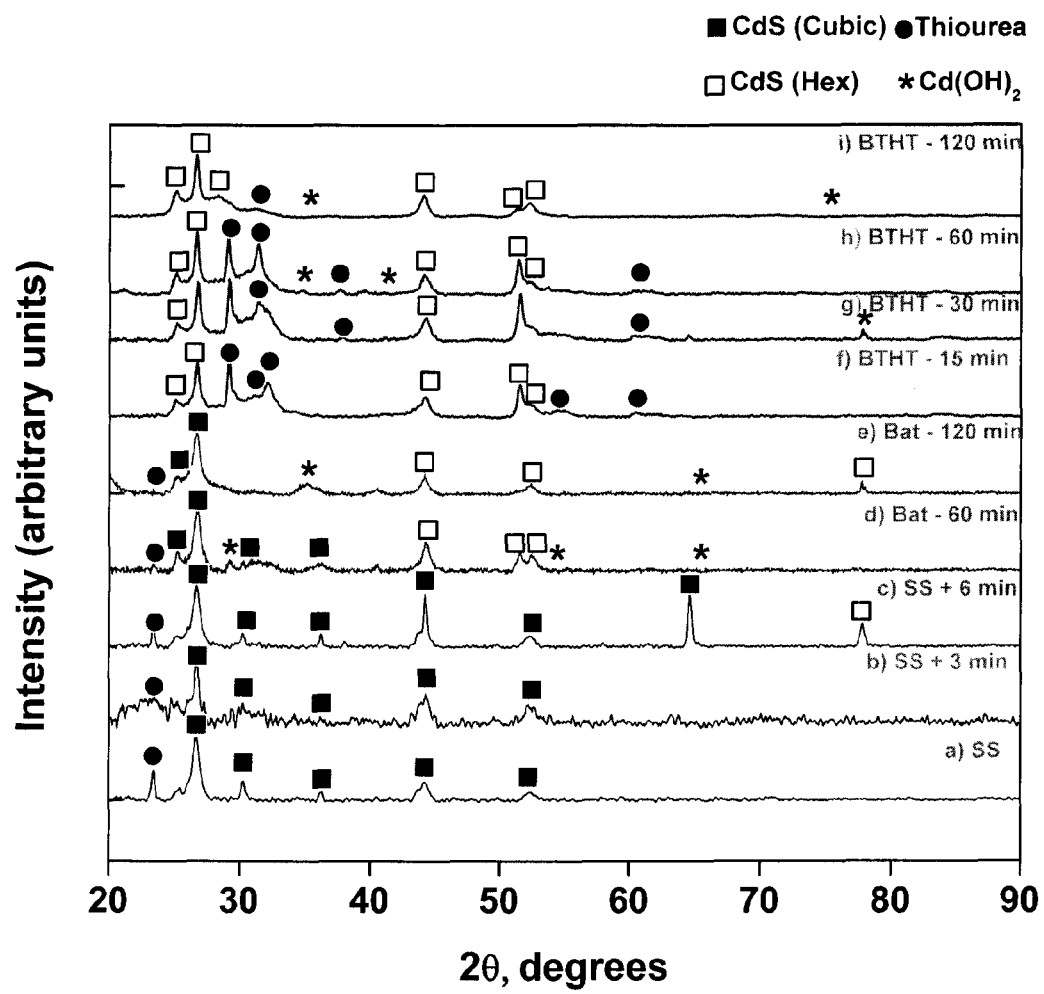

FIG. 7 provides an X-ray diffraction analysis of CdS nanoparticles. SS—onset of steady state in continuous ultrasound heating. Bat—batch ultrasound induced heating. BTHT—batch conventional heating.

Figure 8:
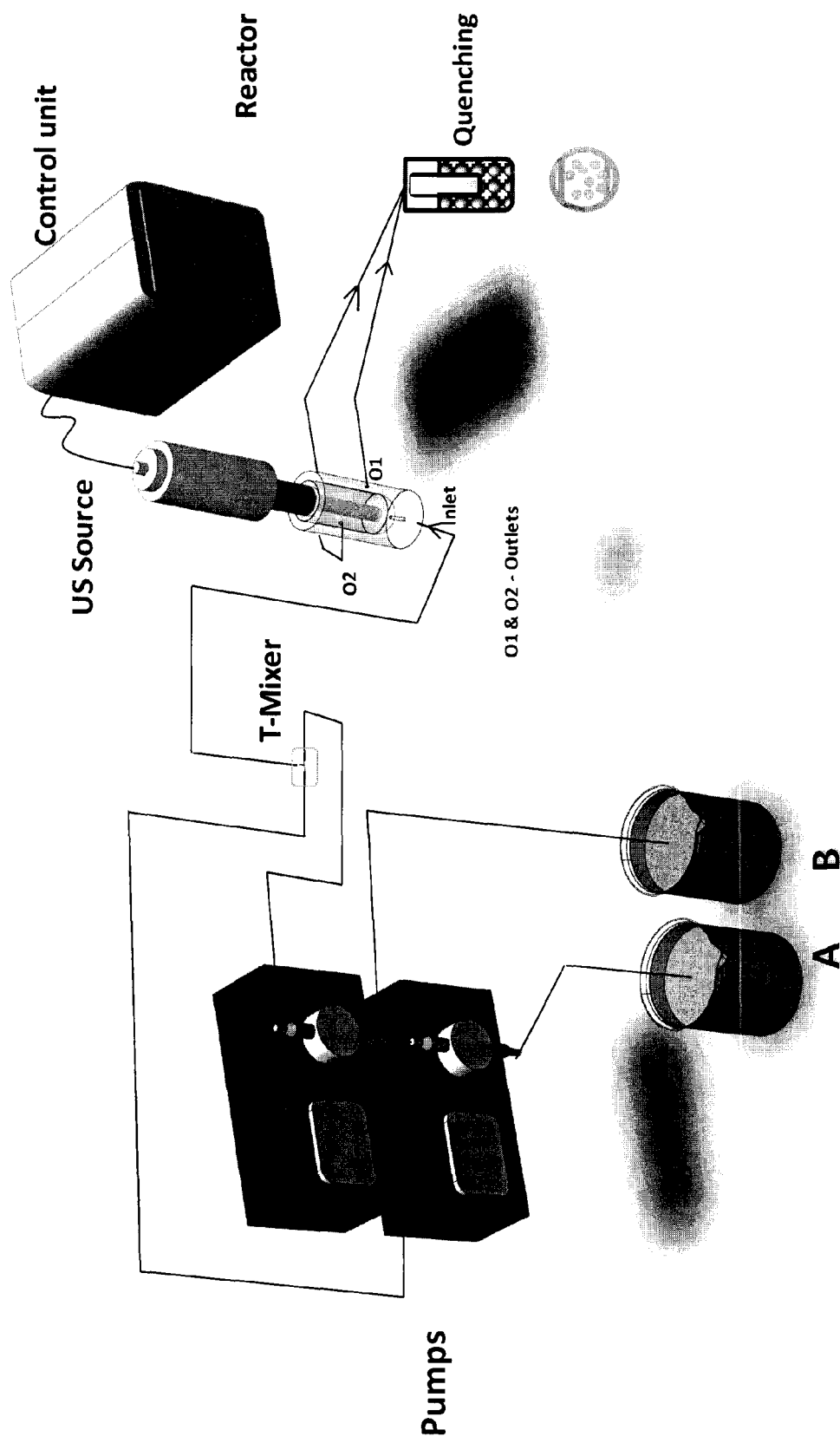

FIG. 8 provides a schematic of another continuous sonochemical reactor setup with multiple outlets.

Figure 9:
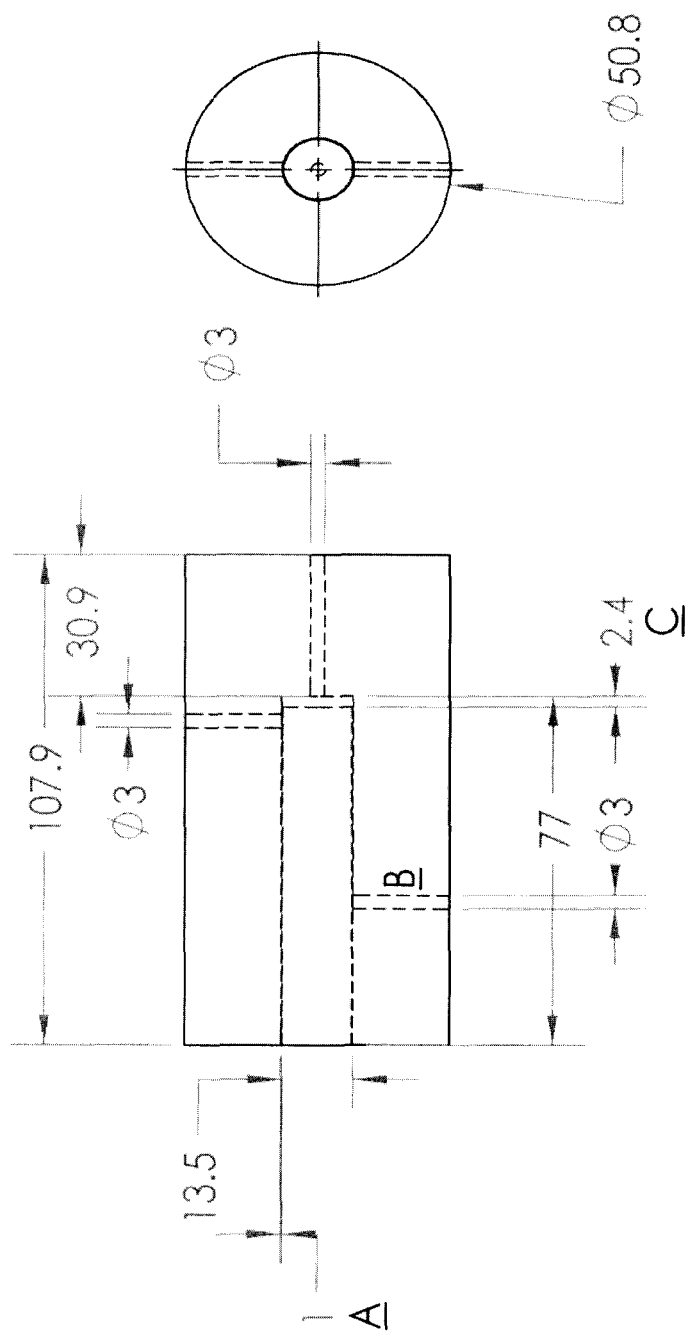

FIG. 9 provides a schematic of a reactor configuration for the continuous synthesis of CdS quantum dots (QDs) using ultrasonic energy.

Figure 10:
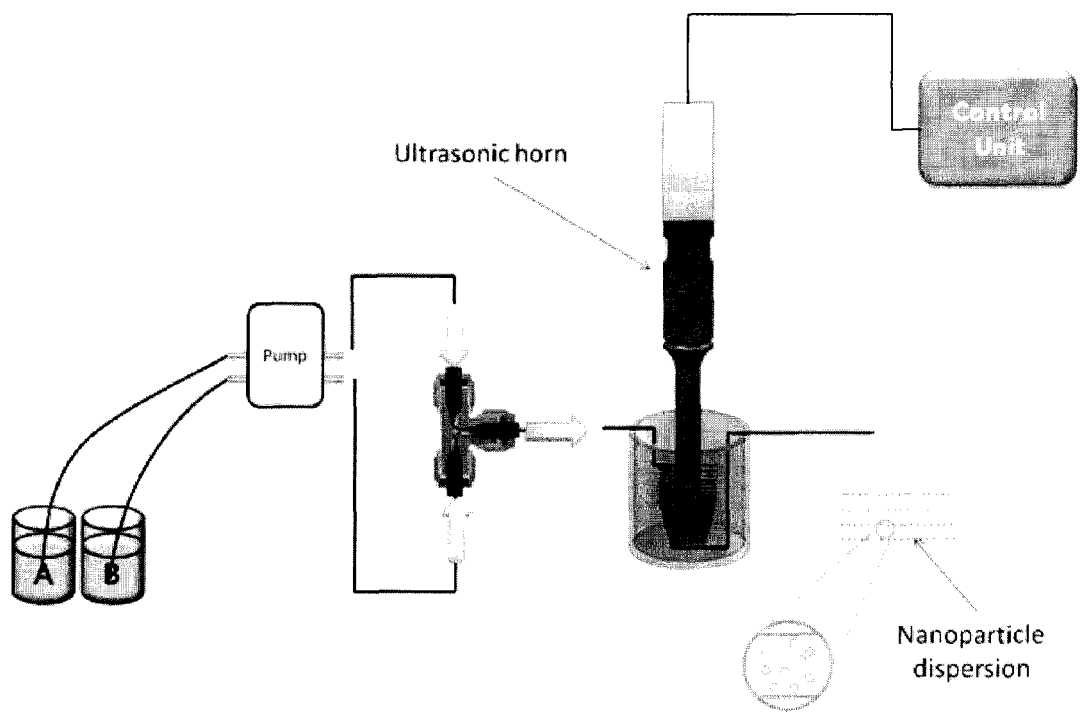

FIG. 10 provides a schematic for a layout for higher resident time under sonication in continuous synthesis.

FIG. 11 provides schematics of various reactors. FIG. 11A depicts a typical continuous reactor with a single side port. FIG. 11B depicts a continuous reactor with two aligned ports. FIG. 11C depicts a continuous reactor with a narrowed reaction chamber. FIG. 11D depicts a continuous reactor with a narrowed reaction chamber and two aligned side ports. FIG. 11E depicts a continuous reactor with a narrowed reaction chamber and conical end. FIG. 11F depicts a continuous reactor with a narrowed reaction chamber, conical end, and two aligned side ports. FIG. 11G depicts a continuous reactor with a narrowed reaction chamber and flat end. FIG. 11H depicts a continuous reactor with a narrowed reaction chamber, a flat end, and two aligned side ports. FIG. 11I depicts a continuous reactor with a narrowed reaction chamber and inbuilt cooling ports. This is a one-piece design as opposed to using an additional cooling ring. Cooling channels may comprise of two or more sets with inflow and outflow of coolant allowing for excess heat to be removed. It is possible to use this concept for an in situ quenching of reaction as temperatures can be reduced at high rates.

Figure 12:
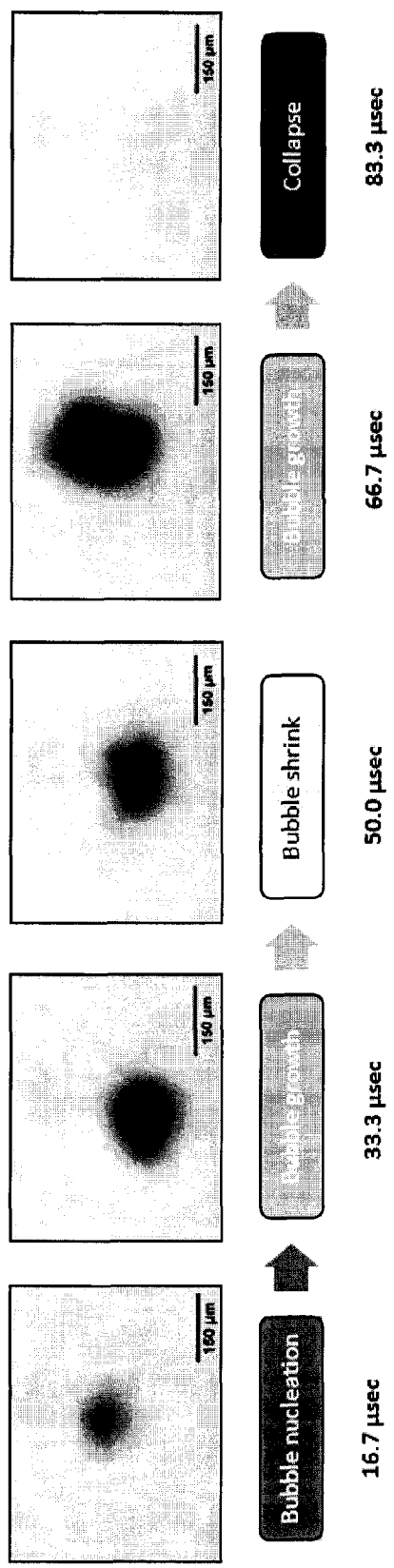

FIG. 12 provides images of bubble growth dynamics in various stages during acoustic cavitation.

Figure 13:
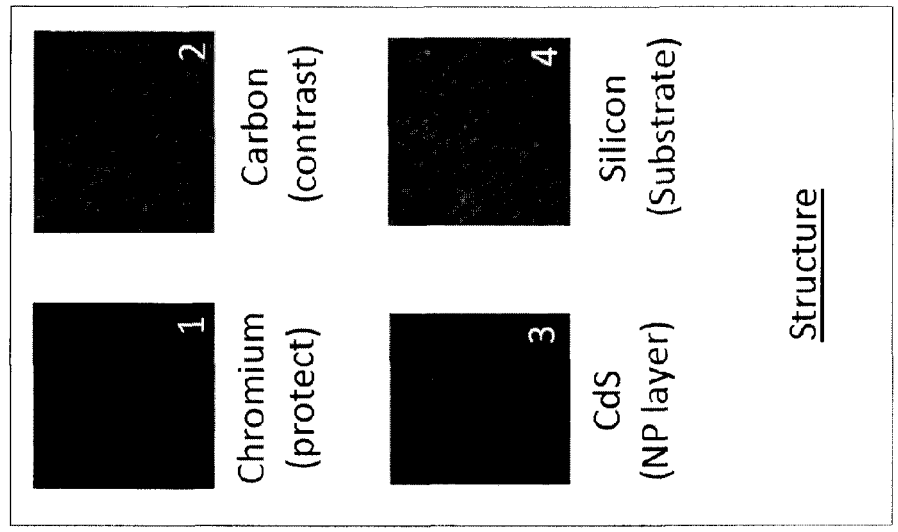
Figure 13:
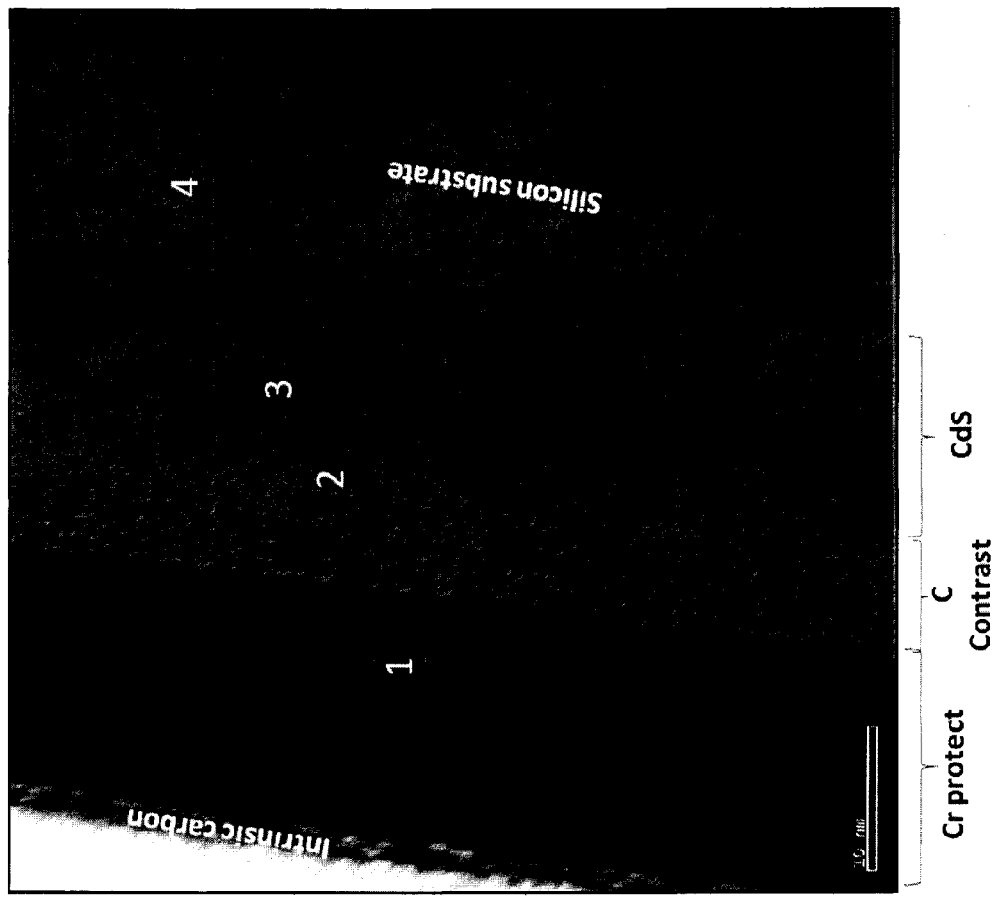

FIG. 13 provides a cross sectional TEM image showing differentiation in contrast from various layers and zoomed areas showing structure.

Figure 14:
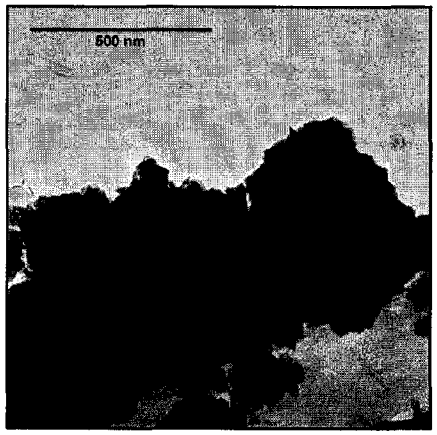
Figure 14:
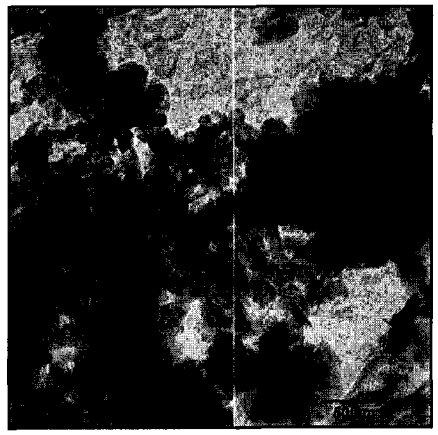
Figure 14:
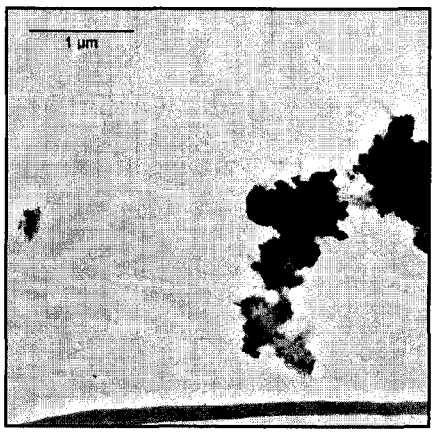
Figure 14:
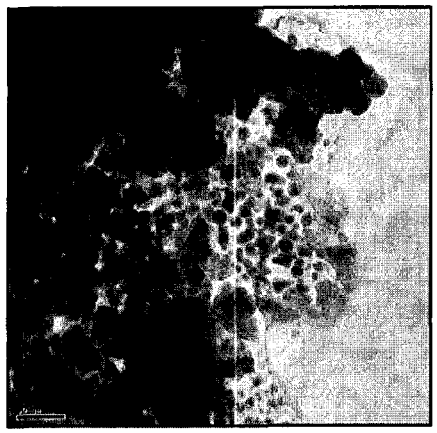

FIG. 14 provides images of CdS particle morphology in batch conventional heating induced synthesis.

Figure 15:
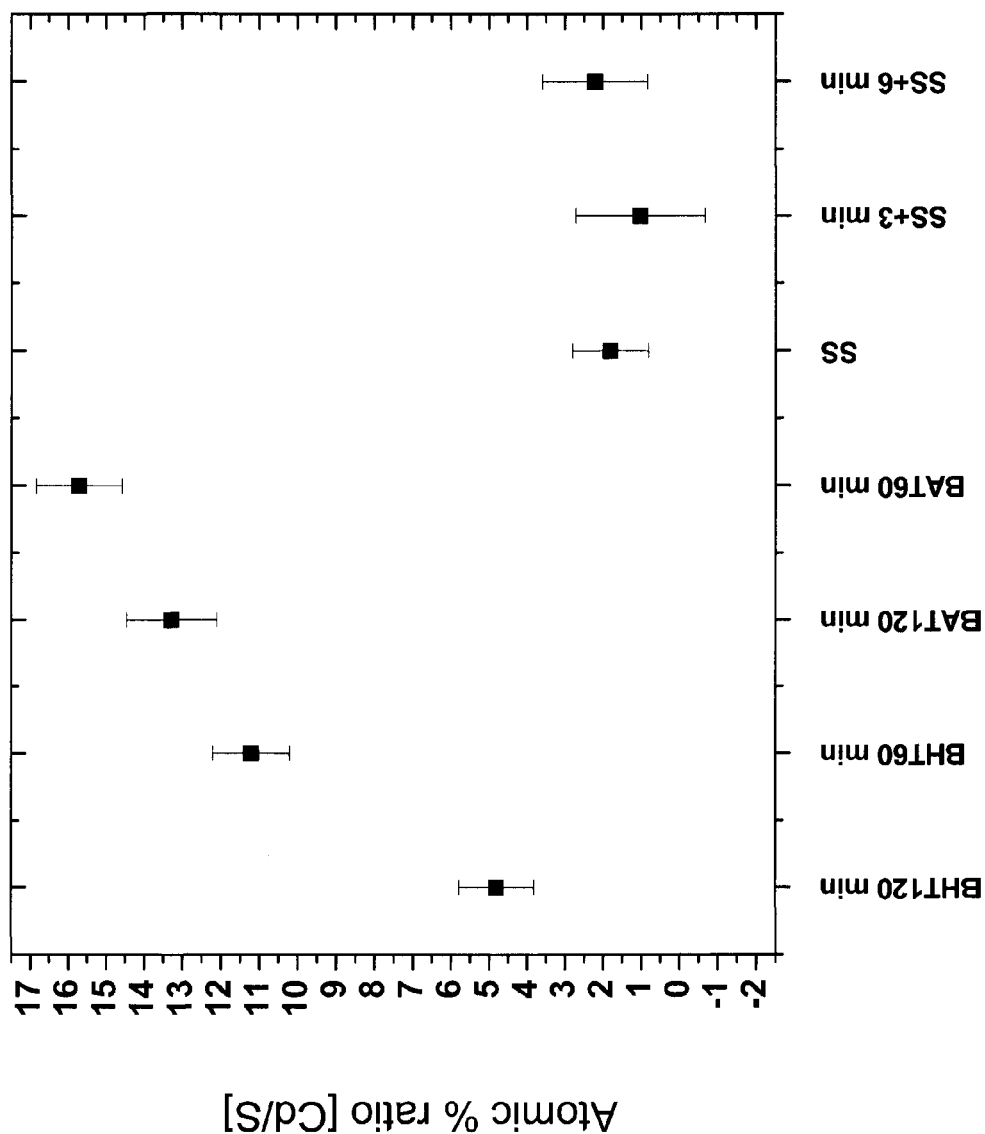

FIG. 15 provides a graph of the compositional homogeneity shown as atomic % ratio of Cd to S in various samples. BHT—Batch conventional heating. BAT—Batch ultrasound heating. SS—Continuous ultrasound heating at steady state.

DETAILED DESCRIPTION OF THE INVENTION

A novel, low-cost approach for high volume production of nanoparticles using continuously flowing medium exposed to ultrasound is described herein. The method produces nanoparticles of high size uniformity with high aspect ratio shapes (e.g., hexagonal platelets) and uncommon crystal structure. The approach also results in stabilizing metastable crystal structures of nanoparticles. Notably, the high aspect ratio particles synthesized by the instant invention may be used in quantum dot applications.

Cadmium sulfide nanoparticles generally exhibit quantum confinement effects when the particle size is less than 10 nm and approaches the Bohr exciton radius. It is a widely used buffer material in solar cells owing to its wide band transmission of solar light and is, therefore, used as a window layer in photovoltaic devices. Sonochemical synthesis permits the rapid heating of reactant baths by acoustic cavitation leading to high local temperatures. Herein, superior sonochemical methods for heating and synthesis are reported. These results were used to design experiments for the continuous synthesis of CdS nanoparticles using a sonochemical reactor consisting of a reactor and a high intensity horn. Results are compared and summarized between the two cases.

Traditionally, ultrasound energy has been used in a variety of applications including communication, non-destructive materials testing, medical evaluation and ranging (Mason, T. J. (1990) Chemistry with Ultrasound, Elsevier Science Pub. Co.). In terms of materials processing, it has been widely used in welding of plastics and metals, laboratory cleaning, and sonochemistry (Mason and Phillip (2002) Applied Sonochemistry, Wiley-VCH, Weinheim, Germany) Ultrasound is differentiated by the frequency, generally over 20 kHz in terms of applications. High frequency in the range of 2-10 MHz is generally used in diagnostics while low frequency 20-100 kHz is used in sonochemical applications (Ley and Low (1989) Ultrasound in Synthesis, Springer-Verlag, Berlin, Germany). Ultrasound energy can interact with liquids producing mechanical, thermal, and chemical effects on the liquid (Colussi et al. (1998) J. Phys. Chem. A, 102: 6927-6934). When an ultrasound source couples with a fluid, bubbles are set up which cause cavitation. It is this cavitation that is most useful for driving sonochemical synthesis. It is well known that acoustic energy is mainly a mechanical oscillation with frequencies much lower than those observed for molecular vibrations. Cavitation is the primary phenomenon caused by overcoming the molecular attraction within the liquid resulting in bubble nucleation and growth during the rarefaction half cycles (van Eldik and Hubbard (1996) Chemistry under Extreme and Non-classical Conditions, Wiley). Occurrence of cavitation is dictated by Blake threshold which is defined as the minimum acoustic power required to cause cavitation in a liquid (Physical Rev. (1949) 75:1279-1336). It has been observed that the threshold can be lowered by other processes which assist cavitation.

As stated hereinabove, the primary cause for cavitation is due to the presence of dissolved gases in the liquid which assist in bubble nucleation. Since the liquid is sonically coupled with the horn, sound waves propagate through the liquid during each cycle of the horn. During the rarefaction half cycle the bubble grows and reaches a critical size before it implodes in a compression half cycle (Colussi et al. (1998) J. Phys. Chem. A, 102:6927-6934; Suslick and Flannigan (2008) Annu. Rev. Phys. Chem., 59:659-683). The implosion is widely believed to increase the temperature of the surrounding liquid to over 5000° C. and causes a pressure increase of nearly 1000 atm (Suslick and Price (1999) Ann. Rev. Mater. Sci., 29:295-326; Suslick et al. (1999) Applications of Sonochemistry to Materials Synthesis, Kluwer Publishers, Dordrecht, Netherlands). Such effects have been observed experimentally (Ciawi et al. (2006) J. Phys. Chem. B, 110:13656-13660). The bubble collapse event lasts for less than a nanosecond and causes extremely high cooling rates in the order of $10^{11}$ K/s. This high cooling rate reduces particle growth effects and thus results in formation of nanoparticles. Depending on chemistry and hotspot conditions, the particles can vary in crystallinity. However, in general, amorphous particles are obtained.

In sonochemistry, s bubbles are formed, the reaction proceeds from the bubble interior to the bubble wall, comprising a vapor-liquid interface, to the surrounding liquid. For a reactant mixture, the bubble interior consists of solvent and solute vapors. If a non-volatile solvent is used, presence of only the vapors of the solute can be achieved inside the bubble, thus maintaining the reaction within the bubble (Mastai and Gedanken (2006) ChemInform, 37(17)). Vapors continue to diffuse into the bubble during the growth phase of the bubble from the adjacent liquid.

The instantaneous temperature rise upon collapse of a bubble due to adiabatic implosion is given by:

$$T_{max} = T_0 \left[ \frac{P_{ex}(\gamma - 1)}{P_{bub}} \right].$$

Where $T_{max}$ is the temperature reached after the collapse of the bubble, $T_0$ is the temperature of the bath, gamma is the adiabatic index, $P_{ex}$ is the external pressure=hydrostatic+ acoustic pressure and $P_{bub}$ is the pressure of the gas inside the cavity at the point of collapse. In turn, the maximum pressure inside the bubble at the moment of implosion (Neppiras, E. A. (1980) Phys. Rep., 61:159-251) is given by:

$$P_{max} = P_{bub} \left[ \frac{P_{ex}(\gamma - 1)}{P_{bub}} \right]^{\frac{\gamma}{\gamma-1}}.$$

Some of the various extrinsic variables that affect the sonochemical reactivity are frequency, power, and bulk temperature (Ley and Low (1989) Ultrasound in Synthesis, Springer-Verlag, Berlin, Germany; Luche, J. L. (1987) Ultrasonics, 25:40-44; Schumb et al. (1937) Met. Alloys, 8:126-132; Horton, J. P. (1953) J. Acoust. Soc. Am., 25:480-484).

It has been observed that changing frequency between 10 Hz to 10 MHz does not cause significant effect on cavitation since this only alters the resonant size of the cavitation bubble and is negligible over this range (Margulis et al. (1982) Zh. Fiz. Khim., 56:1941-1945). It is important to note that 10× more power is required to make a liquid like water to cavitate at 400 kHz than at 10 kHz. This is primarily because power losses are increased due to the increased rate of molecular motion at higher frequencies. This is also an important reason for the wide use of 20 kHz frequency for sonochemical applications.

Power input to the horn can change the amount of liquid undergoing cavitation and hence affect reaction rate (Luche, J. L. (1987) Ultrasonics 25:40-44). There is a limit to the power input to the liquid as increasing bubble nucleation due to an increase in power input can cause separation of horn from liquid causing disruption of power transfer with time.

Since bulk temperature affects the vapor pressure of the solvent, the nucleation rate of bubbles can be increased with increasing temperature up until the increase in vapor pressure controls the reactivity of the system (Luche, J. L. (1987) Ultrasonics 25:40-44; Schumb et al. (1937) Met. Alloys 8:126-132; Horton, J. P. (1953) 25:480-484).

There are three parts in a bubble where reactions proceed: the bubble interior, the wall comprising of vapor-liquid interface, and the surrounding liquid (Mason, T. J. (1999) Sonochemistry, Oxford University Press). The bubble interior consists of solvent in a pure solvent case and contains vapors of the solute phase in a reactant mixture. Vapors continue to diffuse into the bubble during the growth phase of the bubble from the adjacent liquid. Nucleation of particles occurs within bubbles and has already been validated experimentally (Chow et al. (2005) Ultrasonics, 43:227-230), this process is called sonocrystallization (Luque de Castro and Priego-Capote (2007) Ultrasonics Sonochem., 14:717-724). In general, the particle size distribution is narrower via sonocrystallization than other methods used in absence of ultrasound (e.g., microfluidic-based routes). Table 1 shows a corresponding comparison of coefficient of variation (COV) based on data reported for these nanoparticle synthesis routes.

TABLE 1

Nanoparticle size distributions. Data obtained from Mastai et al. (2006) ChemInform 37: 17; Schumb et al. (1937) Met. Alloys 8: 126-132; Fujimoto et al. (2001) Chem. Mater., 13: 1057-1060; Mizukoshi et al. (1997) J. Phys. Chem., 101: 7033-7037; Siddiqui et al. (2009) Colloids Surfaces A, 350: 38-50; Shalom (2007) Materials Letters, 61: 1146-1150; Sugano et al. (2010) Microfluidics Nanofluidics, 1-10; Peterson et al. (2011) Nanotechnology 666-670; Salazar-Alvarez et al. (2006) Chem. Engr. Sci., 61: 4625-4633; Pan et al. (2009) Chem. Comm., 7233.

| Material | Avg Size (nm) | SD (nm) | COV (%) | Synthesis Approach |
|---|---|---|---|---|
| Pd | 3.6 | 0.7 | 19.4 | Sonochem |
| Au/Pd | 8.0 | 1.1 | 13.8 | Sonochem |
| CdSe | 8.0 | 0.6 | 8.0 | Sonochem |
| CdSe | 3.0 | 0.6 | 19.7 | Sonochem |
| CdSe | 4.0 | 0.7 | 17.0 | Sonochem |
| CdSe | 5.5 | 0.6 | 10.2 | Sonochem |
| $Fe_3O_4$ | 9.8 | 3.5 | 35.9 | Ultrasound assisted |
| $Fe_3O_4$ | 12.4 | 5.3 | 42.7 | Ultrasound assisted |
| Au | 2.9 | 0.6 | 20.7 | Microfluidic reactor |
| Au | 34.0 | 7.8 | 23.0 | Microfluidic reactor |
| CdS | 4.5 | 1.0 | 22.2 | Microfluidic reactor |
| $Fe_3O_4$ | 5.2 | 2.0 | 38.5 | Microfluidic reactor |
| Zeolite | 140.0 | 46.5 | 33.2 | Microfluidic reactor |

In the sonochemical synthesis route, heating by cavitation and bubble implosion provides a potential route to high temperature reactions from a liquid phase. Sonochemistry has been used for the synthesis of nanoparticles of various semiconductor materials like CdS (Ghows et al. (2011) Ultrasonics Sonochem., 18:269-275; Wang et al. (2003) Preparation of Cube-Shaped CdS Nanoparticles by Sonochemical Method, in World Scientific Pub Co Inc., pp. 63) and PbS (Wang et al. (2006) Langmuir, 22:398-401; Xie et al. (2006) J. Materials Sci., 42:1376-1380) in batch modes. It has been demonstrated that a surfactant free approach using sonochemistry can be used to generate well dispersed CdS NPs (Ghows et al. (2011) Ultrasonics Sonochem., 18:269-275). However in batch mode, long residence times measured in hours can make process control more difficult due to the chemistry being exposed to the ultrasound energy multiple times. Further, batch ultrasound chemistries are difficult to scale-up. In continuous sonochemical synthesis, residence times can be reduced from several hours to less than a minute or just seconds, making it easier to control reaction conditions. Also, conventional solution processing does not yield high aspect ratio particles or high temperature phases. In general, very little research has been performed on continuous sonochemical synthesis (Banert et al. (2004) Chem. Ing. Tech., 76:1380-1381; Banert et al. (2006) Proc. 5. WCPT, 23-27).

It is important to note that ultrasound attenuates as a function of distance in front of the horn and away from it. Attenuation is an exponential function, strongly dependent on the attenuation coefficient (a) (Mason and Phillip (2002) Applied Sonochemistry, Wiley-VCH, Weinheim, Germany) as given by:

$$I = I_0 \exp(-2\alpha d)$$

Where I is intensity at distance d from the source and $I_0$ is the initial intensity. Another approach to look at attenuation is based on acoustic pressure amplitude as a function of distance (Yasui et al. (2008) Phys. Rev. E, 77:016609) using the equation:

$$P(d) = \rho c v \left| 2\sin\left(\frac{\pi}{\lambda}\left(\sqrt{d^2 + a^2} - d\right)\right)\right|.$$

Where P(d) is the acoustic pressure amplitude as a function of distance d, ρ is the density of the liquid, c is velocity of sound in the liquid, v is the velocity amplitude of the horn, λ is the wavelength of the sound and a is the radius of the horn tip. Based on the above equation, for a case where cavitation is present the reduction of amplitude with distance from the horn tip is show in FIG. 1.

Herein, superior sonochemical methods and apparatuses for the synthesis of nanoparticles or quantum dots are provided. The methods and apparatuses provide at least the following benefits. First, the upstream micromixing of the instant invention results in the reduction of processing time because the ultrasound is primarily used to raise temperature of mixed reactants to reaction temperature and not for mixing. Indeed, the upstream micromixing stage can reduce the processing time from on the order of several hours to less than a minute. Additionally, the instant methods and apparatuses allow for the production of high aspect ratio shaped nanoparticles of binary compounds and stabilize uncommon crystal structures within these nanoparticles. The high aspect ratio may result in nanoparticles having one dimension of less than 10 nm. Indeed, the instant invention is sufficient for producing quantum confinement in several semiconductor material systems like CdS, PbS, CdSe, and the like and, therefore, can be used in quantum dot applications. The invention may also be used for producing nanoparticles of insulators (e.g., $SiO_2$, $CeO_2$, and the like) and/or metals (e.g., Au, Pd, Pt, Ag, etc.).

The instant inventions also allows for flexibility within the sonochemical reactor. As explained herein, consumable sleeve inserts may be used to reduce internal volume to easily produce alternate designs to enhance ultrasound exposure within the sonochemical reactor. Once the preferred arrangement of the sonochemical reactor has been established, then a single piece sonochemical reactor (i.e., without consumable sleeve inserts) can be manufactured with the appropriate internal geometry to reduce consumable costs.

In accordance with the instant invention, methods of producing nanoparticles (e.g., quantum dots, insulators, metal nanoparticles) are provided. While the instant invention generally describes the synthesis of nanoparticles, the methods and apparatus of the instant invention may be used to catalyze any chemical reaction, particularly one that requires elevated reaction temperatures. The nanoparticles may comprise metals, bimetallic alloys, binary, ternary, and quaternary compounds. In a particular embodiment, the nanoparticles comprise binary compounds. Examples of binary compounds include, without limitation: chalcogenides such as CdS, PdS, CdSe, InSe, ZnS, ZnSe, CdTe, PbSe, SnS, SnTe, ZnO, $Bi_2Te_3$, $CeO_2$, $SiO_2$, and $TiO_2$; pnictides such as AlAs, GaAs, InAs, GaP, $Cd_3As_2$, $Zn_3P_2$, $Zn_3As_2$, $Zn_3Sb_2$, GaSb, and $Cd_3Sb_2$; carbides like $Mo_2C$ and $W_2C$; metals like Au, Pd, Ag, Cu, Tl, Pt, and Hf and bimetallics like PdCu, PtRh, AuPd, PdAg, AuRu, and AuAg. The process can be extended to multiple (e.g., two) steps to produce other compounds such as ternary compounds like $CuInSe_2$, AlGaAs, InGaAs, GaAsN, GaAsP, and CdZnTe using again chalcogens and pnicogens. The process may also be used to produce quarternary compounds containing elements from the chalcogens, pnicogens, boron and carbon group combined with an electropositive element like Ti, Zr, Hf, Re, Ru, Rh, Fe, Co, Ni, Cu, Zn Pd, Ag, Cd and Hg. In a particular embodiment, the nanoparticle is a cadmium sulfide nanoparticle.

The methods of the instant invention comprise mixing the reagents to synthesize the nanoparticles and exposing the mixture to high intensity ultrasound to form the nanoparticles. The method may be performed in batch or in continuous flow. However, as demonstrated hereinbelow, superior results are obtained through the use of a continuous flow method. Indeed, particles synthesized using continuous flow had only a 25% coefficient of variation in particle size whereas particles synthesized in batch had about a 90% coefficient of variation.

In a particular embodiment, the individual reagents for the formation of the nanoparticle are pumped into a vessel for mixing (mixer). For continuous production of nanoparticles, the reagents may be continually added to the mixer through inlet tubes. In one embodiment, the mixer comprises at least two inlets (e.g., via inlet tubes) for the introduction of at least two fluid streams into the mixing vessel and at least one outlet. The inlets are arranged such that the fluids are introduced into a confined region where mixing of the fluids can occur rapidly. For example, the inlets may be arranged such that the fluid streams are directed at one another. Preferably, the confined region is beneficial to enhancing the mixing of the fluids. Examples of mixers include, without limitation, a micromixer such as a Y-mixer, T-mixer, oscillatory flow, reverse oscillatory flow mixer, or interdigital mixer. Indeed, a micromixer provides enhanced mixing and temporal resolution over batch mixing.

The mixed, unreacted reagents are then exposed to ultrasound under conditions to yield localized areas of temperatures at and/or exceeding the reaction temperature for the formation of the nanoparticles. In general, the mixed, unreacted reagents are passed through a region of exposure to the ultrasound for sufficient time to have localized areas of temperatures above the reaction temperature. In a particular embodiment, the fluid residence time within the region of exposure to ultrasound sufficient to reach the reaction temperature (e.g., within the continuous reactor) is less than three minutes, less than two minutes, less than one minute, about 30 seconds to 60 seconds, or about 40 seconds to about 50 seconds. The ultrasound may, for example, have an average power of about 1 to about 1000 W, about 10 to about 200 W, about 50 to about 150 W, or about 100 W. The frequency of the ultrasound may be about 10 to about 100 kHz, about 10 kHz to about 50 kHz, or about 20 kHz.

In a particular embodiment, the mixed, unreacted reagents are passed through tubing in proximity to the ultrasound horn, particularly tubing forming a helical loop comprising a conical section around the ultrasound horn tip. In a particular embodiment, the tubing is a metal (e.g., stainless steel or titanium alloy). In a particular embodiment, the tubing diameter is from about 0.1 mm to about 5 mm, particularly about 0.3 mm to about 3 mm.

In a particular embodiment, the method comprises directing the mixed, unreacted reagents to a continuous reactor, wherein the continuous reactor comprises a confined internal region and at least one inlet, at least one outlet, and an ultrasound horn oriented such that the acoustic energy is transferred to the mixture of unreacted agents within the continuous reactor. The resultant mixture of reacted nanoparticles may then be quenched.

The reaction temperature for the formation of the nanoparticles may be very high and approach or exceed the boiling temperature of water. Accordingly, the nanoparticle reagents may be contained within aqueous solutions comprising agents which increase the boiling point of the solution (e.g., above that of water) but do not significantly interfere with the reaction to form the nanoparticles (i.e., inert). In a particular embodiment, the reaction temperature is lower than the boiling point of the solution. Such an arrangement allows for the avoidance of bubble production and vapor lock. In a particular embodiment, the reaction solution is azeotropic. Examples of suitable azeotropic solutions include, without limitation: mixtures of 1) water and 2) an alcohol such as ethanol, n-propanol, or isopropanol or 3) ethylene glycol, butylene glycol, propylene glycol, allyl alcohol, benzyl alcohol, furfuryl alcohol, cyclohexanol, benzene, toluene, cyclohexane, tetrahydrofuran, hydrazine, carbon disulfide or the like. In a particular embodiment, the reaction solution comprises a mixture of water and ethylene glycol (e.g., at about a 1:1 ratio).

The above methods will typically result in high pressures being achieved, particularly within the continuous reactor. Accordingly, in a particular embodiment, the device used for controlling fluid flow (e.g., a pump) in the instant methods is capable of handling the high back pressure to ensure continuous flow of reactants through the sonochemical reactor (continuous reactor). In a particular embodiment, the pump is a piston pump. The flow rate of the reagents to the mixer may vary depending on the particular nanoparticle being formed and the particular reagents used. Typically, the flow rate will be from about 0.1 ml/min to about 100 ml/min, from about 0.5 ml/min to about 50 ml/min, about 1 ml/min to about 25 ml/min, about 5 ml/min to about 20 ml/min, or about 10 ml/min.

With regard to the continuous reactor, the cell should be made of material (e.g., metal) of sufficient strength to withstand the high pressure within the chamber. In a particular embodiment, the cell is made of stainless steel or a titanium alloy. Additionally, the high pressure inside the reactor can produce high stresses on threaded connections, such as where the ultrasound horn is typically connected. Accordingly, thread free couplings can enhance system life, especially when scaled up. To avoid potential complications from such high pressure stress, a single metal piece reactor design comprising the ultrasound horn may be utilized. Alternatively, the ultrasound horn may be coupled to the continuous reactor through other non-threaded means such as flange or slip fit.

As stated hereinabove, the reactor may comprise more than one outlet and/or more than one inlet (e.g., two). In a particular embodiment, the more than one inlets are different distances from the tip of the ultrasound horn and/or the outlet stream, thereby allowing for the acquisition of nanoparticles having different exposure times and intensities with the ultrasound. Typically, the inlet nearest the horn tip will be open and operational, but it may also be desirable to have the solution enter distally (e.g., closer to the top). In a particular embodiment, the more than one outlets are different distances from the tip of the ultrasound horn and/or the inlet stream, thereby allowing for the acquisition of nanoparticles having different exposure times and intensities with the ultrasound. Typically, the outlet nearest the horn tip will be open and operational. However, more distal outlets (e.g., outlet B in FIG. 9) can be used to obtain fluid exposed to a lower intensity ultrasound from the sides of the horn. This lower intensity exposure may help the growth phase of the synthesized particles where kinetics can be allowably slower. The lower intensity ultrasound and higher residence time may yield nanoparticles with different crystallinity and particle size compared to those produced from the higher intensity of the horn tip.

Fast processing times with the instant invention are achieved, in part, due to a reduction of volume in the continuous reactor. The volume within the continuous reactor may be obtained through the production of a single metal piece reactor design with the desired dimensions or through the use of inserts within the cell. The reduced internal volume enables high energy/volume imparted to the liquid and thus much faster heating rates. One advantage of the consumable inserts is the ability to adjust and optimize conditions for a particular reaction in an efficient and affordable manner. However, the high temperatures of the reaction chamber will likely result in the damaging the consumable insert, thereby making the single metal piece reactor design preferable for long term synthesis of nanoparticles.

Example 2 and FIGS. 9 and 11 provide examples of modifying the internal volume of the continuous reactor. In a particular embodiment, the internal space is configured such that the majority of the fluid experiences the higher intensity ultrasound at the horn tip. In a particular embodiment, the internal volume of the continuous reactor is less than about 15 ml, between about 1 ml and about 15 ml, about 5 ml to about 10 ml, or about 8 ml.

As described herein, a consumable insert can be placed around the ultrasound horn while leaving the tip exposed in the fluid. Such inserts can be made of a high density material such as polystyrene foam, polyethylene (UHMW, HD), PTFE, and Acetal. In a particular embodiment, the depth of the fluid in front of the horn tip is reduced, particularly to less than about 5 mm, particularly about 2.4 mm. A consumable insert can be placed in front of the inlet port, wherein the insert comprises a channel for the fluid to flow through to the horn. Such inserts can be made of materials such as polymers, plastic, rubber, or cork.

FIG. 11 also provides schematics of various continuous reactor designs. The modifications depicted may be made through the use of inserts in the reactor as described above or the reactors may be made to the desired specifications without inserts. FIG. 11 depicts reactors with a reduced internal volume by a narrowing of the chamber, but the internal volume may also be reduced by shortening the distance within the reactor (e.g., from horn tip to base). The base of the internal chamber may also be of any shape, as depicted in FIG. 11. For example, the base may be hemispherical, flat, conical, etc. The schematics in FIG. 11 also show one or two side ports. However, as explained above, the reactors may contain more side ports. Further, the ports need not be aligned as depicted in FIG. 11. The ports may be on the same side of the reactor, may be at different heights on the reactor, and/or need not be perpendicular to the reactor (e.g., the ports may lead to the internal chamber at an angle).

Figure 11A:
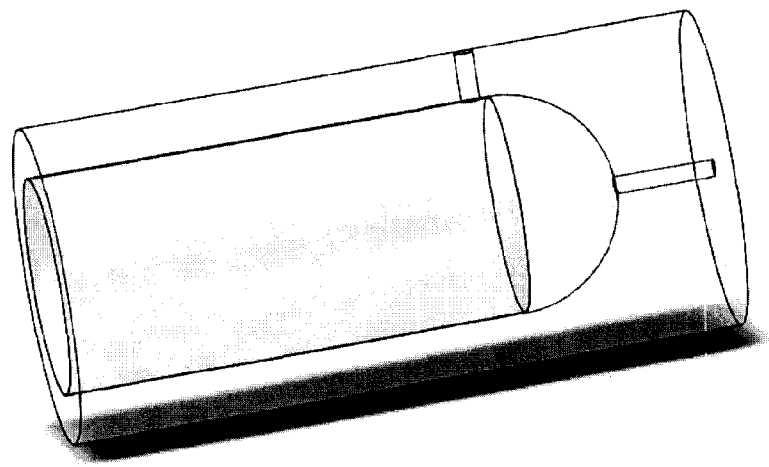
Figure 11B:
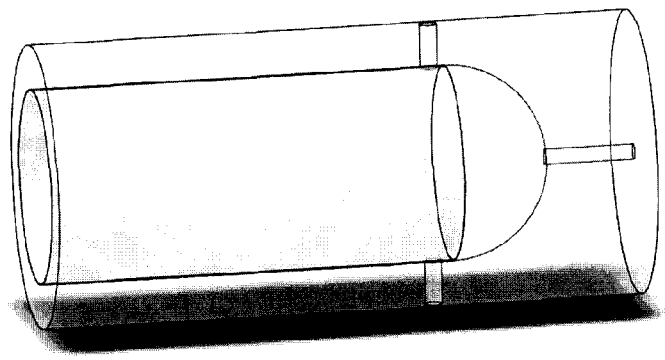
Figure 11C:
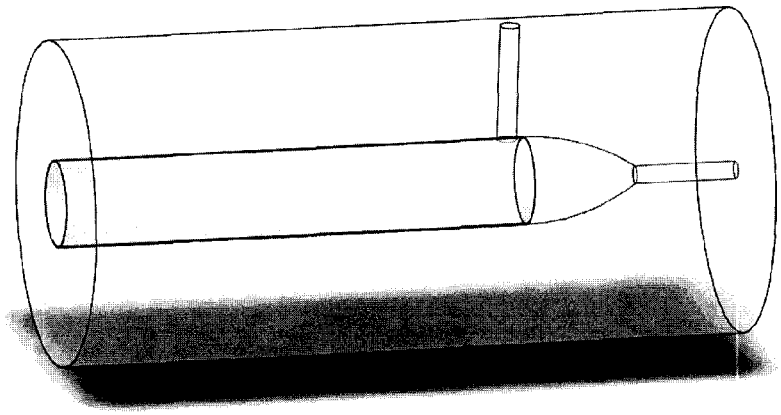
Figure 11D:
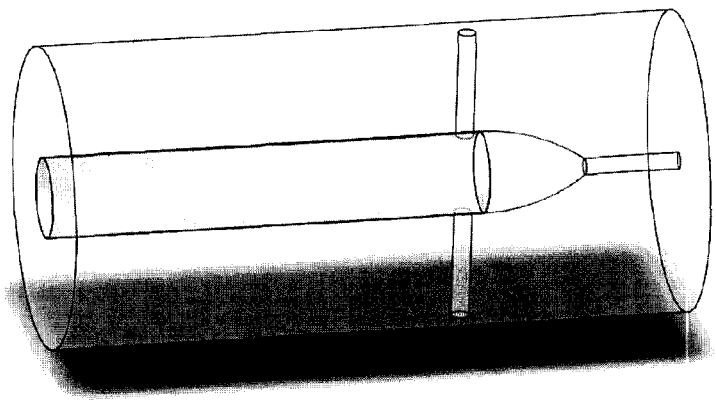
Figure 11E:
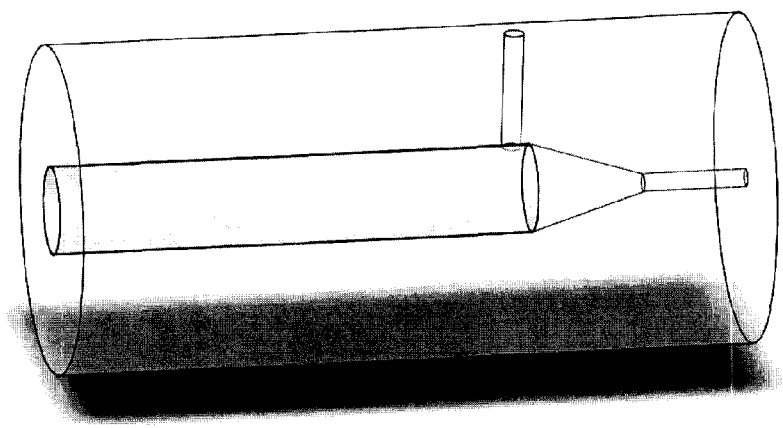
Figure 11F:
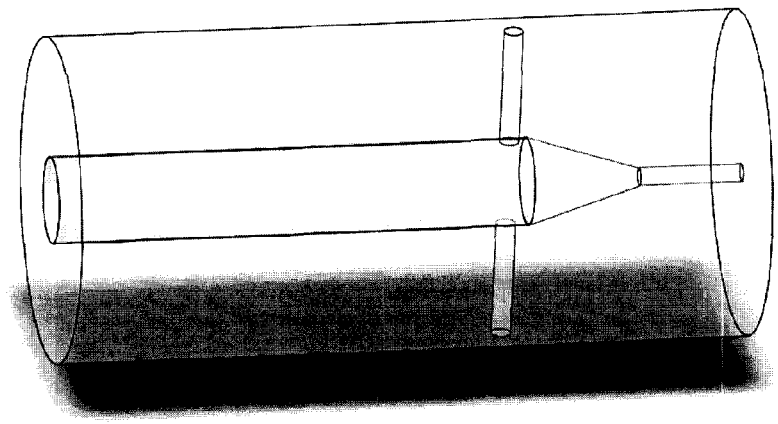
Figure 11G:
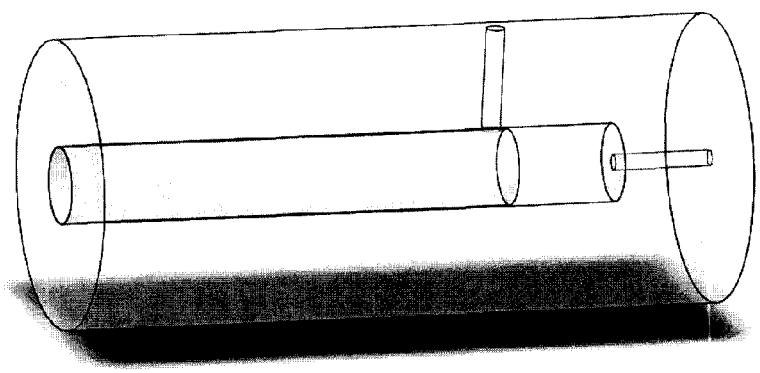
Figure 11H:
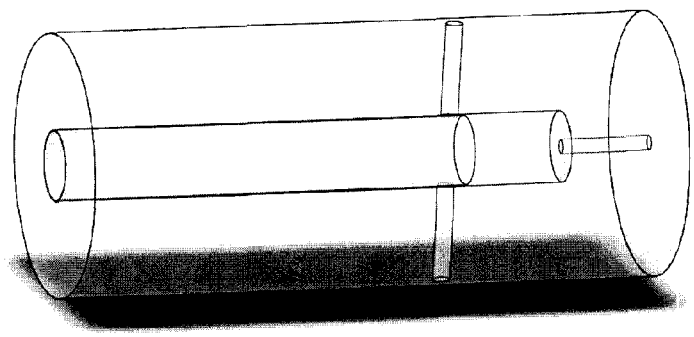
Figure 11I:
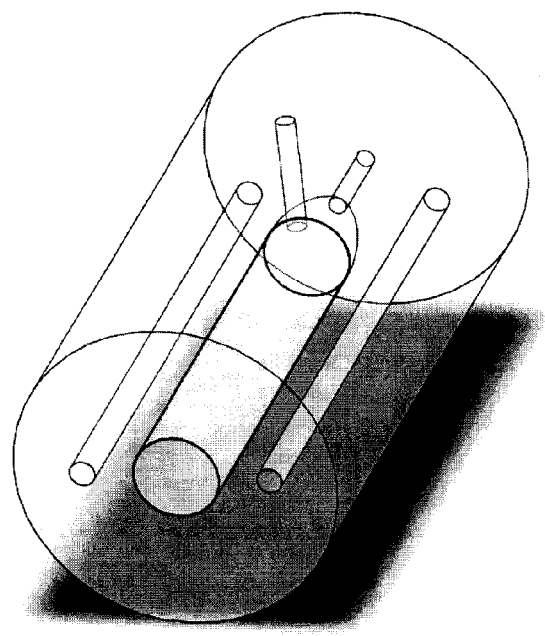

To assist with the high temperatures of the reaction chamber, the methods and apparatuses of the instant invention may also comprise a cooling system. The cooling system may be placed anywhere in or around the apparatus, e.g., around the continuous reactor or the helical loop. In a particular embodiment, a cooling ring or helix or a cooling bath comprising circulated cooling liquid (e.g., water) may be used (e.g., around the reactor surface). The cooling system may also be run through the reactor. For example, the reactor may comprise one or more cooling channels through the reactor (e.g., within the walls of the chamber). FIG. 11I depicts a reactor having two cooling channels. The cooling channels may be symmetrically or asymmetrically oriented within the reactor. The channels may take any path within the reactor (e.g., straight (as depicted in FIG. 11I) or curved (e.g., wrapped at least partly around the inner chamber). In another embodiment, the helical loop around the ultrasound horn is placed in a cooling bath, optionally comprising circulating cooling liquid.

The nanoparticles exiting the continuous reactor may be subsequently quenched. In a particular embodiment, the quencher comprises an alcohol (e.g., methanol, ethanol, isopropanol) and/or a ketone (acetone) and/or an ice/low temperature bath. As explained hereinbelow, quenching may be delayed after exiting the continuous reactor to allow further maturation or ripening of the nanoparticles. Lengthening the delay may result in the generation of smaller nanoparticles. The quenching may be delayed up to several hours, about one hour, about 45 minutes, about 30 minutes, or about 15 minutes.

In accordance with the instant invention, apparatuses (systems) for performing the above methods are provided. The apparatuses may comprise the components described hereinabove. FIGS. 3, 8 and 10 provide examples of the apparatuses. While the apparatuses are depicted as connected individual units, the individual components may be combined or housed in a single larger unit for ease of use.

In a particular embodiment, the apparatus comprises a mixer in fluid connection with a continuous reactor, wherein the continuous reactor comprises at least one inlet, at least one outlet, and an ultrasound horn oriented such that the acoustic energy is transferred to the fluid within the continuous reactor. The apparatus may further comprise a control unit for regulating the ultrasound horn of the continuous reactor. The apparatus may further comprise a pump in fluid connection with the mixer. The pump may be in fluid connection with reservoirs or vessels comprising the reagents or fluids to be pumped into the mixer. The apparatus may further comprise a vessel or reservoir in fluid connection with the continuous reactor (e.g., via the outlet) for collection and/or quenching of the formed nanoparticles. The apparatus may further comprise a cooling system (e.g., a circulating cooling liquid system).

In one embodiment of the instant invention, the apparatus comprises 1) a mixer in fluid connection with tubing comprising a conical shape, and 2) an ultrasound horn oriented with the horn tip within the conical shape portion of the tubing, particularly within the lower, narrower half of the conical portion. The conical portion of the tubing and the ultrasound horn tip are submerged in a liquid, particularly a cooling system. The apparatus may further comprise a control unit for regulating the ultrasound horn. The apparatus may further comprise a pump in fluid connection with the mixer. The pump may be in fluid connection with reservoirs or vessels comprising the reagents or fluids to be pumped into the mixer. The apparatus may further comprise a vessel or reservoir in fluid connection with the tubing for collection and/or quenching of the formed nanoparticles. The apparatus may further comprise a cooling system (e.g., a circulating cooling liquid system).

DEFINITIONS

The following definitions are provided to facilitate an understanding of the present invention:

The singular forms "a," "an," and "the" include plural referents unless the context clearly dictates otherwise.

The term "azeotropic" refers to a mixture of two or more liquids in such a ratio that its composition is not changed by simple distillation.

The term "micromixer" refers to a mixer where the mixing region is typically only about several tens of micrometers to about several hundred micrometers in one dimension.

As used herein, the term "quantum dot" refers to a semiconductor structure whose excitons are confined in all three spatial dimensions. More particularly, the quantum dot may be a nanoparticle of a semiconductor (e.g., a nanoparticle with a diameter of less than about 10 nm).

As used herein, the term "nanoparticles" refers to a discrete particle or crystal with at least one dimension having a size between about 1 nm to about 1000 nm, between about 1 nm to 100 nm, between about 1 nm and about 50 nm, or between about 1 nm and about 25 nm. A nanoparticle having a high aspect ratio includes nanoparticles wherein the length of one dimension compared to the length of another dimension is at least 2:1, 3:1, 5:1, 10:1, or greater.

The following examples provide illustrative methods of practicing the instant invention, and are not intended to limit the scope of the invention in any way.

EXAMPLE 1

A reactor setup that could be coupled with an ultrasound horn with maximum power inverter rating of 750 W was acquired from Sonics & Materials, Inc. (VCX 750). This setup was modified so that the internal volume was reduced to reduce fluid residence time. FIG. 2 shows the effect of modifying the liquid volume that is subjected to the ultrasound. It can be clearly observed that upon reduction of the internal volume by ~90% the heating rate goes up by a factor of 5× in the first minute for pure water.

A schematic of the continuous flow setup is shown in FIG. 3. The internal modification results in reduction of volume from 65 ml to 8 ml resulting in a much higher power input per unit volume and thus aiding fast temperature rise of a unit liquid volume towards reaction temperature.

A cadmium chloride and thiourea reactant chemistry was chosen for sonochemical synthesis of cadmium sulfide nanoparticles (Gao et al. (2005) Chem. Mater., 17:887-892). This chemistry involves processing at 85° C. (Mugdur et al. (2007) J. Electrochem. Soc., 154:D482-D488; Chang et al. (2009) Electrochem. Solid-State Lett., 12:H244-H247). The reaction mechanism involves forming a cadmium-thiourea complex —$Cd[SC(NH_2)_2](OH)_2$— which is aided by ammonia released from ammonium chloride-ammonium hydroxide buffer. This controls the release of Cd ions for precipitation into CdS and hence affects the kinetics of the reaction, aimed at controlling the particle size. Table 2 shows the conditions chosen for the reaction in batch and continuous modes. The chemistry was first evaluated in batch mode to check feasibility.

TABLE 2

Experimental conditions for sonochemical synthesis of CdS.

| Parameters | Batch | Continuous |
| --- | --- | --- |
| Chemistry | $CdCl_2 + CS(NH_2)_2 +$ $NH_4Cl + NH_4OH$ | $CdCl_2 + CS(NH_2)_2 +$ $NH_4Cl + NH_4OH$ |
| Processing Time | 120 minutes | 48 seconds |
| Reynolds no | — | 410 |
| Ultrasound Power (Avg.) | 20 W | 100 W |

Since the boiling point of pure water is very close to the reaction temperature of 85° C. and highly localized hot spots result in vapor phase formation, flow disruption occurred due to vapor locks. Hence, an azeotropic mix consisting of water and ethylene glycol in a 1:1 volume was used, since this elevates the boiling point to 107° C. (Bettelheim et al. (2012) Introduction to Organic and Biochemistry, Thomas Brooks/Cole). The nanoparticles were quenched at the outlet, washed, dried and used for observation. A FEI™ Titan™ ChemiSTEM™ (Portland, Oreg.) operating at 300 kV was used to image the nanoparticles. A Bruker-AXS D8 Discover X-ray diffraction unit (Madison, Wis.) was used for phase analysis using XRD patterns.

Experiments were carried out by fixing the concentrations of the reactant in batch mode with constant amplitude while in continuous mode flow rate was fixed at 10 ml/minute net flow rate. FIG. 4 summarizes the TEM results obtained on the nanoparticles during batch synthesis at a) 1 hour and b) 2 hours. At 1 hour, a mixture of very small amorphous particles ordering less than 10 nm along with large chunks of nanoparticles ordering 250 nm are also observed. The small particles correspond to freshly formed nuclei which is apparent from their amorphous nature as observed from the weak contrast from the TEM images. At 2 hours, a wide distribution of irregular shaped particles is present. This shows higher conversion of the reactants owing to the presence of higher fraction of particles. It is also apparent that the particle size distribution is wide ranging from 50 nm to 200 nm suggesting poor process control.

Within the reactor, the mixed reactants are subjected to ultrasound exposure. At a fluid residence time of 48 seconds, with exposure to ultrasound at an average power of 100 W, the same chemistry was run through the reactor. The fluid temperature inside the reactor rose at a rate of ~50° C./minute. When the fluid reached a reaction temperature of 85° C., the outflow was found to be pale yellow in color which is characteristic of a suspension containing cadmium sulfide. The cadmium sulfide nanoparticles were collected and quenched in a vial to stop the reaction and then imaged using the TEM.

The corresponding images are shown in FIG. 5A. It is apparent the predominant morphology of samples collected at various points in steady state (SS)—after onset, 3 minutes into SS, and 6 minutes into SS is hexagonal platelets. Since the particles are electron thin and contrast from overlying particles are observed in the micrographs, the particles are expected to be the thin platelets. FIG. 5B shows the particle size distribution of the corresponding images. The distributions are nearly normal with a predominant skewing to the left that shifts the mean. The corresponding mean particle sizes are listed in Table 3. Notably, the average sizes of the particle are almost same with similar standard deviations. It can be concluded that the particle sizes are almost invariant independent of time of sampling during steady state. A low coefficient of variation repeatedly indicates good process control and essentially is due to low spread in the particle size distribution.

TABLE 3

Particle size statistics for CdS NPs synthesized via continuous sonochemistry.

|  | SS | SS + 3 minutes | SS + 6 minutes |
| --- | --- | --- | --- |
| Avg. size (nm) | 19.3 | 21.3 | 22.9 |
| SD (nm) | 6.2 | 5.2 | 5.8 |
| COV % | 32.6% | 24.3% | 25.2% |

In another experiment, samples collected at steady state were quenched at various delays to check the progress of the reaction with time after the particles leave the sonochemical reactor. FIG. 6 shows the particle morphology and distribution as a function of quench delay time.

An interesting morphological evolution occurs upon observing the TEM images. NPs quenched after 15 minutes from collection still retain hexagonal platelet shape while at 30 minutes the particle edges appear to get rounded or smooth. The faceted appearance starts to disappear and is completely absent when quenching is delayed by 1 hour where in the particles appear to be well rounded or nearly spherical. It is also interesting to note that the shape of the particle size distribution in FIG. 6B does not change with quench delay indicating that the distribution follows the same trend with time. The corresponding mean sizes are listed in Table 4.

TABLE 4

Effect of quench delay on mean particle size.

| Quench Delay | 15 minutes | 30 minutes | 60 minutes |
| --- | --- | --- | --- |
| Avg. size (nm) | 31.7 | 21.7 | 12.5 |
| SD (nm) | 11.1 | 4.9 | 5.1 |
| COV % | 35.2 | 22.7 | 40.8 |

From Table 4, it is apparent that the NP average size is decreasing with quench delay time. This indicates that another particle growth mechanism is active instead of the classical Ostwald ripening. One reason that the average size is decreasing is because the particle morphology changes from a high aspect ratio platelet to a spherical particle. Since volume has to be conserved, the average particle size decreases. Without being bound by theory, this rearrangement of particle shape and size could occur by surface diffusion of Cd and S ions around the particles.

FIG. 7 shows the x-ray diffraction study performed on the CdS chemistry wherein batch and continuous synthesis modes are compared. From the XRD results, it can be observed that there are more cubic CdS peaks in continuous mode when compared to batch synthesis where majority of the peaks belong to hexagonal CdS. The patterns were indexed using standards 80-0006 for hexagonal CdS and 89-0440 for cubic CdS in conjunction with ICDD PDF-2 database. A solitary thiourea peak from (020) plane due to incomplete conversion is observed in the continuous mode. The peak intensity is found to decrease in batch synthesis in 60 minutes of reaction time and almost disappears at 120 minutes suggesting higher conversion of reactants. This is typical in continuous synthesis routes involving higher than room temperature reactions. In conventional heating, it can be observed that all the CdS peaks are of hexagonal crystal structure and there are no cubic CdS peaks. This shows that the metastable hexagonal CdS cannot be achieved in conventional heating for the same chemistry. It can also be noted that there are thiourea peaks present in this synthesis mode and as synthesis time increases the thiourea peaks reduce in number suggesting completion of the reaction and higher utilization of the reactants. There appears to be cadmium hydroxide peaks which is an intermediary phase during the reaction in both batch ultrasound heating and batch conventional heating. This indicates that the sulfur is not being used up completely in the reaction for synthesis of CdS.

Several factors influence the crystal structure of CdS particles with the vital ones being cadmium source and sulfur source. In general when sodium sulfide is used as a reactant, it entails formation of cubic CdS even with various Cd sources while usage of organic sulfur sources (thio groups) generally result in formation of mixture of cubic and hexagonal phases of CdS (Fu et al. (2005) Mater. Res. Bull., 40:1591-1598). In sonochemical synthesis, the structure is in addition affected by ultrasound and kind of sonication (dispersed vs. intense). Also solvation of the reagents and interfacial forces for various kinds of Cd salt solutions affect structure (Ghows et al. (2011) Ultrasonics Sonochem., 18:269-275). Typical vapor phase methods for production of high aspect ratio particles (belts, tubes and wires) involve temperatures above 800° C. (Zhai et al. (2010) Nanoscale, 2:168-187) and result in formation of hexagonal CdS. Cubic CdS is reported to be a metastable phase (Gorer et al. (1997) Mater. Lett., 31:209-214) as opposed to hexagonal CdS and reverts to this structure upon heating to temperatures above 300° C. (Wan et al. (2010) Thin Solid Films, 518:6858-6865). Continuous sonochemical synthesis of CdS appears to have stabilized cubic phase in high aspect ratio nanoparticles (hexagonal platelets) in this case. It is to be noted that typical microwave synthesis, i.e. another high energy rapid heating technique, yields hexagonal CdS particles (Amutha et al. (2011) J. Nanosci. Nanotechnol., 11:7940-7944).

Continuous synthesis provides an 8× reduction in processing time while at the same time exhibiting better process control on particle size and shape distribution. Synthesis of high aspect ratio nanoparticles with uncommon crystal structure can be achieved using this approach. A coefficient of variation of ~25% in nanoparticles averaging 20 nm demonstrates the ability for scale up applications.

EXAMPLE 2

Herein, ultrasonic (US) technology is used in concert with the continuous flow synthesis of quantum dots (QDs). Two key issues associated with the continuous flow synthesis of QDs within microchannels are: 1) the large residence time distributions associated with laminar flow leading to particle size distributions; and 2) clogging. Efforts have been made to develop an ultrasonic setup capable of continuously synthesizing QDs in larger channels. Advantages of this approach are: 1) rapid heating and synthesis by ultrasonic energy will reduce the effect of residence time distribution on particle size distribution; and 2) larger channel dimensions will lead to less clogging.

FIG. 8 provides a schematic of an ultrasonic setup to study the effect of ultrasonic synthesis on the particle size distribution of chalcogenide QDs. CdS nanoparticles will be synthesized using a chemistry consisting of ethylenediamine, $CS_2$, $CdCl_2.2H_2O$ (Ghows and Entezari (2011) Ultrasonics Sonochem., 18:269-275), ultrasonic synthesis helps with QD dispersion (Bang and Suslick (2010) Adv. Mater., 22:1039-1059; Han et al. (2006) Mater. Lett., 60:3782-3785) and sphericity of particles (Kristl et al. (2010) Ultrasonics Sonochem., 17:916-922).

Room temperature reagents will be mixed using a T-mixer. The well-mixed, unreacted reagents will enter a stainless steel continuous reactor (FIGS. 7 and 8) equipped with an ultrasonic horn made of Ti-6Al-4V and are subjected to ultrasonic exposure. The reactor is suitable for higher intensity ultrasound exposure. The reaction proceeds instantaneously and the outflow from either outlet O1 or O2 is quenched in a vial containing methanol.

Three modifications of the ultrasonic horn are shown in FIGS. 9 and 11. The first modification is to narrow the internal volume of the reactor (e.g., with a tube insert that fits between the horn and the interior walls of the chamber). This reduces the processing volume without drastically affecting the ultrasound characteristics. This is to ensure that the bulk of the fluid entering the reactor would experience the higher intensity ultrasound in front of the horn tip. The material used for this may be polystyrene foam because a high density material attached onto the horn would modify the ultrasound intensity.

The second modification is an insert at the base of the chamber. This insert may modify the shape of the base of the internal chamber. For example, the insert may change the base from a hemispherical shape to a conical or flat surface. This may be achieved by using either rubber or cork. This modification reduces the residence time of synthesized nanoparticles still in suspension. The mixed reactants enter the reactor through the orifice. Using this modification, the height of the cylindrical volume in front of the horn can be reduced to as low as 2.4 mm. This is depicted in FIG. 9, region C.

The third modification is to employ outlets of various distances from the horn tip. For example, a distal outlet could be closed while a proximal outlet was used. However, the distal outlet can serve as an alternate outlet where the fluid is exposed to a lower intensity ultrasound from the sides of the horn. This can help the growth phase of the synthesized particles where kinetics can be allowably slower. This modification allows for the study of the effect of higher residence time on crystallinity and particle size. An example is shown in FIG. 9, region B.

EXAMPLE 3

Ultrasound may be used to increase the residence time of a high temperature (>100° C.) reaction. FIG. 10 shows a setup for studying the exposure of ultrasound to high temperature reactions over a longer residence time. The reacting fluids are mixed within a T-mixer prior to ultrasound exposure and allowed to pass through a helical loop. The loop is placed in a bath to derive heat as the ultrasound horn is placed directly above the conical section of the helix within the bath. This will allow for the mixed reagents flowing through the helix to remain within the ultrasound field for a longer time.

EXAMPLE 4

Bubble nucleation, growth and cavitation are the primary phenomena occurring within the continuous reactor. In order to reduce the internal volume of the reactor the critical dimension has to be significantly larger than the critical bubble size at cavitation. This ensures constant outflow without pressure buildup within the reactor. To evaluate this, a high speed camera (Phantom Miro, Wayne, N.J., USA) was used to capture the stages in bubble cavitation directly below the high intensity ultrasound horn. The images were captured at 60,000 frames per second to capture a phenomenon occurring based on the input of 20 kHZ ultrasonic energy. FIG. 12 shows the high speed images and the various stages can be observed. The bubble diameter during the growth phase was found to be less than 150 μm.

EXAMPLE 5

To evaluate the thickness of the nanoparticle platelets, the product sampled after 6 minutes from steady state were used to form a thin film on a silicon substrate. On the as coated sample a carbon coating is deposited for contrast and a chromium layer is deposited for protecting the top surface of the film from the focused ion beam used to section the sample. Subsequently this section was further polished in the ion beam and observed under the TEM for finding the dimension of the nanoparticles in the thickness direction. More specifically, the CdS NPs were deposited onto a Si substrate and cross-sections of size 15 μm×6 μm×0.2 μm were prepared using focused ion beam (FIB) milling cross-sectioning technique (FEI Quanta 3D Dual Beam SEM/FIB) at 30 kV. The results are provided in FIG. 13.

It can be easily observed that the CdS nanoparticle layer is 10 nm thick and within this layer sub10 nm features could be discerned suggesting that the 22 nm hexagonal platelets have a thickness less than 10 nm. In order to validate whether the hexagonal platelets could be formed only in the sonochemical route a study using conventional heating using a hot plate for the same chemistry was performed. Yellow precipitates were formed and were prepared for subsequent TEM examination. The results are shown in FIG. 14. It can be observed that the particle size varies from about 20 nm to 0.5 μm after 1 hour synthesis time and varies from about 20 nm to 1 μm after 2 hours synthesis time. It is obvious that the size dispersion is really poor and it is notable that there are no hexagonal shaped particles. Even after 2 hours of synthesis it can be seen that there are long strands of unreacted thiourea spanning several μm as seen from bottom left image in FIG. 14. This shows that hexagonal shaped CdS nanoparticles are observed only in the sonochemical route and to a higher degree in the continuous mode.

Stoichiometry of the CdS NPs was measured using energy dispersive spectroscopy. The Cd to Sulfur ratio was found to be 1:1 showing that the stoichiometry is at equilibrium and homogenous. Further, large scale compositional sampling of approx 4 μm$^3$ was performed using wave dispersive spectroscopy to look at compositional homogeneity in the precipitates. A SX-100 CAMECA Electron microprobe analyzer (Gennevillier, France) was used to evaluate the composition of nanoparticles using wave dispersive spectroscopy. The results are summarized in FIG. 15. Upon examining the results, it can be noted that for the steady state continuous synthesis the atomic ratio is very close to the expected 1:1 for Cd:S within the standard error limits. For conventional heating the ratio is much greater than 1 while in batch ultrasound it is worse showing very high cadmium concentration. This is congruent to what was observed in the XRD results showing presence of intermediary $Cd(OH)_2$ phase along with unreacted thiourea. This indicates that continuous sonochemical synthesis yields much better purity CdS and also indicates higher utilization of the reactants for synthesis of CdS.

The foregoing shows that continuous sonochemical synthesis is capable of producing a meta-stable phase of CdS in the form of high aspect ratio platelets. Nanoparticles with an average size of 20 nm with a COV of ~25% can be readily obtained. The phase and shape of the NPs provide evidence of high reaction temperatures. Moreover, nanoparticles with a high aspect ratio and uncommon crystal structure may be synthesized. Additionally, relative to other processes, continuous sonochemical synthesis provides an 8× to 150× reduction in processing time (e.g., from 120 minutes to 48 seconds) while exhibiting good size and compositional uniformity of the product. Particle size can be controlled with the use of azeotropic solvents rather than surfactants. At steady state, the size of the hexagonals averaged 21.0 nm in diameter with an average coefficient of variation of 27.4%. The thickness of the nanoplatelets was found to be less than 10 nm, allowing for quantum confinement and application as quantum wells.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method for synthesizing nanoparticles, said method comprising:
    a) mixing at least two solutions comprising the components of the nanoparticles within a micromixer, wherein the resultant mixed solution is azeotropic;
    b) exposing the mixed, unreacted solution from step a) to ultrasound; and
    c) collecting the nanoparticles generated from step b).

2. The method of claim 1, wherein said nanoparticles are cadmium sulfide nanoparticles.

3. The method of claim 1, wherein said micromixer comprises at least two inlets and an outlet, wherein said inlets direct fluid streams into a confined mixing region.

4. The method of claim 3, wherein said micromixer is a T-mixer.

5. The method of claim 1, wherein said method further comprises quenching the nanoparticles generated in step b).

6. The method of claim 1, wherein said ultrasound has an average power of about 10 W to 200W and a frequency of about 10 kHz to about 100 kHz.

7. The method of claim 1, wherein the fluid residence time in the exposure to ultrasound in step b) is less than about three minutes.

8. The method of claim 7, wherein the fluid residence time in the exposure to ultrasound in step b) is about 30 seconds to about 60 seconds.

9. The method of claim 1, wherein the mixed, unreacted solution from step a) is exposed to ultrasound within a continuous reactor, wherein said continuous reactor comprises at least one inlet, at least one outlet, and an ultrasound horn, wherein said ultrasound horn is oriented such that the tip of the ultrasound horn is in contact with the mixed, unreacted solution.

10. The method of claim 9, wherein the internal volume of the continuous reactor is less than about 10 ml.

11. The method of claim 9, wherein the depth of the fluid in front of the tip of the ultrasound horn is less than about 5 mm.

12. The method of claim 9, further comprising a cooling system around the continuous reactor.

13. The method of claim 1, wherein the mixed, unreacted solution from step a) is exposed to ultrasound within tubing comprising a conical portion, wherein an ultrasound horn is oriented such that the tip of the ultrasound horn is within the conical portion of the tubing.

14. The method of claim 13, wherein said conical portion of tubing and said ultrasound horn tip are submerged in a cooling system.

15. An apparatus for synthesizing nanoparticles of binary compounds, said apparatus comprising a micromixer in fluid connection with a continuous reactor, wherein the continuous reactor comprises at least one inlet, at least one outlet, and an ultrasound horn oriented such that the acoustic energy is transferred to the fluid within the continuous reactor.

16. The apparatus of claim 15 further comprising at least one of the following:
    a) a control unit for regulating the ultrasound horn of the continuous reactor;
    b) a pump in fluid connection with the mixer and, optionally, in fluid connection with reservoirs or vessels comprising the solutions for formation of the nanoparticles;
    c) a vessel or reservoir in fluid connection with the outlet of the continuous reactor; and
    d) a cooling system.

17. The apparatus of claim 15, wherein the internal volume of the continuous reactor is less than about 10 ml.

18. The apparatus of claim 15, wherein the depth of the fluid in front of the tip of the ultrasound horn is less than about 5 mm.

19. An apparatus for synthesizing nanoparticles of binary compounds, said apparatus comprising:
    1) a micromixer in fluid connection with tubing comprising a conical shape; and
    2) an ultrasound horn oriented with the horn tip within the conical shape portion of the tubing, and wherein the conical portion of the tubing and the ultrasound horn tip are submerged in a liquid cooling system.

20. The apparatus of claim 19 further comprising at least one of the following:
    a) a control unit for regulating the ultrasound horn of the continuous reactor;
    b) a pump in fluid connection with the mixer and, optionally, in fluid connection with reservoirs or vessels comprising the solutions for formation of the nanoparticles; and
    c) a receiving vessel or reservoir in fluid connection with the tubing.

21. The method of claim 1, wherein said nanoparticles comprise binary compounds.

22. The method of claim 21, wherein said binary compounds are chalcogenides.

23. The method of claim 22, wherein said chalcogenides are selected from the group consisting of CdS, PdS, CdSe, InSe, ZnS, ZnSe, CdTe, PbSe, SnS, SnTe, ZnO, $Bi_2Te_3$, $CeO_2$, $SiO_2$, and $TiO_2$.

* * * * *